United States Patent [19]
Aoki et al.

[11] Patent Number: 5,579,172
[45] Date of Patent: Nov. 26, 1996

[54] ZOOM LENS SYSTEM

[75] Inventors: Masayuki Aoki, Oyama; Takeshi Suzuki, Ebina, both of Japan

[73] Assignee: Nikon Corporation, Tokyo, Japan

[21] Appl. No.: 270,723

[22] Filed: Jul. 5, 1994

[30] Foreign Application Priority Data

Jul. 19, 1993 [JP] Japan ................................. 5-177139
Jul. 20, 1993 [JP] Japan ................................. 5-178962
Jul. 20, 1993 [JP] Japan ................................. 5-178963

[51] Int. Cl.$^6$ .................................................. G02B 15/14
[52] U.S. Cl. .................................... 359/688; 359/708
[58] Field of Search .................................... 359/682, 683, 359/688, 708

[56] References Cited

U.S. PATENT DOCUMENTS

| | | | |
|---|---|---|---|
| 4,572,620 | 2/1986 | Kikuchi | 350/427 |
| 4,749,267 | 6/1988 | Mihara | 350/427 |
| 4,871,239 | 10/1989 | Masumoto et al. | 350/427 |

FOREIGN PATENT DOCUMENTS

| | | |
|---|---|---|
| 56-147113 | 11/1981 | Japan . |
| 57-53718 | 3/1982 | Japan . |
| 59-79212 | 5/1984 | Japan . |

*Primary Examiner*—Nabil Z. Hindi
*Assistant Examiner*—Dawn-Marie Bey
*Attorney, Agent, or Firm*—Shapiro and Shapiro

[57] ABSTRACT

A zoom lens system comprises, in an order from an object side, a first lens group with a positive refractive power; a second lens group with a negative refractive power; a third lens group with a negative refractive power; and a fourth lens group with a positive refractive power, wherein, for varying a focal length from a wide-end to a telephoto-end, the second lens group is moved from an object side to an image side along an optical axis and the third lens group is moved to reciprocate on the optical axis, the second lens group having an aspherical lens surface, and the aspherical lens surface is formed in a shape where the positive refractive power gradually increases or in a shape where the negative refractive power gradually decreases from the optical axis toward a periphery.

45 Claims, 15 Drawing Sheets

ZOOM LENS SYSTEM

BACKGROUND OF THE INVENTION

1. Field of the Invention

The present invention relates to a small-sized, light zoom lens having a large aperture and a large zooming ratio and, more particularly, a zoom lens suited for use in TV cameras.

2. Related Background Art

There have been known zoom lenses each having a large aperture and a large zooming ratio, comprising four groups of lenses which have positive, negative, negative and positive refractive powers or positive, negative, positive and positive refractive powers in this order from an object side. In these zoom lenses, zooming is carried out by moving the second lens group and the third lens group.

Lately, such demands have been further intensified as for those small-sized, light high performance zoom lenses despite of yet having a large aperture, a wide image angle and a large zooming ratio. Generally, an arrangement of lenses for increasing the powers of respective lens groups has been used as means for further reduction of the weight and down-sizing or for higher level specifications with maintenance of compact, light-weight configuration of the lens system but there has been a problem that aberrations of the lens groups would be sacrificed and therefore their performance would be deteriorated.

SUMMARY OF THE INVENTION

An object of the present invention is therefore to provide a small-sized, light, high performance zoom lens system featured with advanced specifications.

To attain the above-described object, a zoom lens system according to one mode of the present invention comprises the following lens groups in an order from the object side as shown below:

a first lens group having a positive refractive power;

a second lens group having a negative refractive power;

a third lens group having a negative refractive power; and a fourth lens group having a positive refractive power.

In this case, for changing a focal length from a wide-end to a telephoto-end, the second lens group is moved along the optical axis from the object side to the image side and the third lens group is moved to reciprocate along the optical axis.

The first lens group has an aspherical lens surface, which is formed to gradually increase the negative refractive power or gradually decrease the positive refractive power from a point on the optical axis to a peripheral portion, and satisfies the following condition:

$$10^{-3} < |xa(h) - x(h)|/h < 10^{-1} \quad (1)$$

where, h: Maximum effective radius of the aspherical lens surface.

xa(h): Value of x at the maximum effective radius h in a coordinate system where a vertex of the aspherical lens surface is set at the origin, the x axis is set on the optical axis, the y axis is a line which passes through the origin and orthogonally intersects the x axis.

x(h): Value of x of a paraxial curvature radius of the aspherical lens surface at the maximum effective radius h in the above-described coordinate system.

In the above-described zoom lens system according to one mode of the present invention, at least one aspherical surface of the first lens group is preferably formed to increase the negative refractive power or decrease the positive refractive power from the optical axis toward the periphery as compared with the radius of paraxial curvature of this aspherical surface in view of correction of the aberration in the first lens group since the first lens group has the positive refractive power.

In addition, for satisfactory correction of the aberrations and easy production of aspherical lenses, the present invention specifies a range of optimum amount of aspherical surface according to the above condition (1). In this case, if the amount of the aspherical lens surface exceeds the upper limit of the condition (1), it is difficult to produce aspherical lenses due to a substantial increase of the amount of aspherical surface. If the lower limit is exceeded, a spherical aberration at the telephoto-end is under-corrected and therefore such excess of the amount of aspherical surface is undesirable.

In the present invention, for advanced specifications and performance demanded for the zoom lenses for TV cameras, it is preferable that the first lens group is formed to have a negative lens group and at least three positive lens groups in this order from the object side and the second lens group is formed to have at least three lens groups.

Particularly for a compact, light-weight construction of the zoom lens system, it is important to reduce the number of lenses which form the first lens group and, if the first lens group can be formed with three groups or less of lenses by utilizing the aspherical surfaces of lenses, a remarkable effect for the above-described light-weight construction can be obtained. However, such reduction of the number of lenses is not preferable since the shape of the aspherical surface in this case will be complicated with considerable deviation from the radius of paraxial curvature of the aspherical surface and undulations, and therefore manufacturing of such lens system will be difficult and tolerances including eccentricity will be more strictly specified.

In the present invention, if it is attempted to correct a bobbin type distortional aberration by a group of lenses with a negative refractive power, the aberration tends to be under-corrected because of a large spherical aberration at the telescopic side. Therefore it is preferable to provide at least one aspherical surface on one of the negative lens group and the positive lens group, which is located nearest to the object side, of the first lens group. The spherical aberration at the telescopic side can be preferably corrected by the aspherical surfaces of the negative lens group itself and the nearby positive lens group.

For the zoom lens system according to one mode of the present invention, the negative lens group of the first lens group is preferably formed to satisfy the following conditional equation.

$$-0.7 < (R_2 + R_1)/(R_2 - R_1) < 0 \quad (2)$$

where, $R_1$: Radius of paraxial curvature of the lens surface nearest to the object side of the negative lens group $L_{11}$.

$R_2$: Radius of paraxial curvature of the lens surface nearest to the image side of the negative lens group $L_{11}$.

It is not preferable that the negative lens group $L_{11}$ exceeds the upper limit of the condition (2) since the spherical aberration at the telescopic side is under-corrected. In this case, the amount of the aspherical surface should be large for proper correction of this spherical aberration and manufacturing is difficult. It is also not preferable that the negative lens group $L_{11}$ exceeds the lower limit of the condition (2) since the bobbin type distortional aberration increases.

A zoom lens system according to another mode of the present invention is formed to include the following lens groups in order from the object side:

a first lens group with positive refractive power;

a second lens group with negative refractive power;

a third lens group with negative refractive power; and a fourth lens group with positive refractive power.

In this case, for changing a focal length from a wide-end to a telephoto-end, the second lens group is moved along the optical axis from the object side to the image side and the third lens group is moved to reciprocate along the optical axis;

the second lens group has an aspherical lens surface, which is formed to gradually increase the positive refractive power or gradually decrease the negative refractive power from a point on the optical axis to the peripheral portion; and the following conditions are satisfied, $$10^{-3} < |xa(h) - x(h)|/h < 10^{-1} \qquad (3)$$

where, h: Maximum effective radius of the aspherical lens surface.

xa(h): Value of x at the maximum effective radius h in a coordinate system where a vertex of the aspherical lens surface is set at the origin, the x axis is set at the optical axis, the y axis is a line which passes through the origin and orthogonally intersects the x axis.

x(h): Value of x of a radius of paraxial curvature of the aspherical lens surface at the maximum effective radius h in the above-described coordinate system.

In the above-described zoom lens system according to another mode of the present invention, at least one aspherical surface of the second lens group is preferably formed to increase the negative refractive power or decrease the positive refractive power from the optical axis toward the periphery as compared with the radius of paraxial curvature of this aspherical surface in view of correction of the aberration in the second lens group since the first lens group has the positive refractive power.

In addition, for satisfactory correction of the aberrations, the present invention specifies a range of optimum amount of aspherical surface according to the above condition (3). In this case, it is not preferable that the amount of the aspherical surface exceeds the upper limit of the condition (3) since a distortional aberration increases in the shape of a bobbin in a range from an intermediate focal length to the telephoto-end. It is also not preferable that the amount of the aspherical surface exceeds the lower limit since variations of aberrations due to zooming, particularly variations of image curves, are remarkable and the spherical aberration of the telescopic side is over-corrected.

In a zoom lens system according to a further another mode of the present invention, for advanced specifications and performance demanded for the zoom lenses for use in TV cameras, it is preferable that the first lens group is formed to have a negative lens group and at least three positive lens groups and the second lens group is formed to have at least three lens groups in this order from the object side.

In a zoom lens system according to a further another mode of the present invention, it is preferable that the negative lens group of the first lens group satisfies the following condition:

$$-2.0 < (R_2 + R_1)/(R_2 - R_1) < -1.5 \qquad (4)$$

where, $R_1$: Radius of paraxial curvature of the lens surface nearest to the object side of the negative lens group $L_{11}$.

$R_2$: Radius of paraxial curvature of the lens surface nearest to the image side of the negative lens group $L_{11}$.

The condition (4) specifies an optimum shape of the negative lens group, and it is not preferable that the negative lens group exceeds the upper limit of the condition (4) since the spherical aberration of the telescopic side is under-corrected. It is also not preferable that the negative lens group exceeds the lower limit since the bobbin type distortional aberration increases.

A zoom lens system according to a further another mode of the present invention is formed to include the following lens groups in this order from the object side:

a first lens group with positive refractive power;

a second lens group with negative refractive power;

a third lens group with negative refractive power; and a fourth lens group with positive refractive power.

In this case, for changing a focal length from a wide-end to a telephoto-end, the second lens group is moved along the optical axis from the object side to the image side and the third lens group is moved to reciprocate along the optical axis;

the first lens group has at least one aspherical lens surface through which the negative refractive power gradually increases or the positive refractive power gradually decreases from a point on the optical axis toward the periphery;

the second lens group has at least one aspherical lens surface through which the positive refractive power gradually increases or the negative refractive power gradually decreases from a point on the optical axis toward the periphery; and the following conditions are satisfied, $$10^{-3} < |xa_1(h_1) - x_1(h_1)|/h_1 < 10^{-1} \qquad (5)$$

$$10^{-3} < |xa_2(h_2) - x_2(h_2)|/h_2 < 10^{-1} \qquad (6)$$

where, $h_1$: Maximum effective radius of the aspherical lens surface of the first lens group $G_1$.

$h_2$: Maximum effective radius of the aspherical lens surface of the second lens group $G_2$.

$xa_1(h_1)$: Value of x at the maximum effective radius $h_1$ in the coordinate system where the vertex of the aspherical surface of the first lens group $G_1$ is set at the origin, the x axis is set at the optical axis, and the y axis is set as a line which passes through the origin and orthogonally intersects the x axis.

$xa_2(h_2)$: Value of x at the maximum effective radius $h_2$ in the coordinate system where the vertex of the aspherical surface of the second lens group $G_2$ is set at the origin, the x axis is set at the optical axis, and the y axis is set as a line which passes through the origin and orthogonally intersects the x axis.

$x_1(h_1)$: Value of x of the radius of paraxial curvature of the aspherical lens surface at the maximum effective radius $h_1$ in the coordinate system where the vertex of the aspherical surface of the first lens group $G_1$ is set at the origin, the x axis is set at the optical axis, and the y axis is set as a line which passes through the origin and is normal to the x axis.

$x_2(h_2)$: Value of x of the radius of paraxial curvature of the aspherical lens surface at the maximum effective radius $h_2$ in the coordinate system where the vertex of the aspherical surface of the second lens group $G_2$ is set at the origin, the x axis is set at the optical axis, and the y axis is set as a line which passes through the origin and is normal to the x axis.

In a zoom lens system according to a further another mode of the present invention, it is preferable that, since the first lens group has a positive refractive power and the second lens group has a negative refractive power, at least one aspherical lens surface of the first lens group is formed in a shape in which the negative refractive power increases or the positive refractive power decreases from the optical axis toward the periphery as compared with the radius of paraxial curvature of the aspherical lens surface, and at least one aspherical lens surface of the second lens group is formed in a shape in which the positive refractive power increases or the negative refractive power decreases from the optical axis toward the periphery as compared with the radius of paraxial curvature of the aspherical lens surface, taking into account the correction of aberration in respective lens groups.

In addition, for satisfactory correction of aberrations and easy manufacturing of aspherical lenses, the present invention specifies a range of optimum amount of aspherical surface according to the above conditions (5) and (6).

In this case, it is not preferable that the lens groups exceed the upper limit of the condition (5) since the amount of the aspherical surface and therefore it will be extremely difficult to manufacture aspherical surface lenses. It is also not preferable that the lens groups exceed the lower limit since the spherical aberration of the telescopic side is under-corrected.

On the other hand, it is not preferable that the lens groups exceed the upper limit of the condition (6) since a bobbin type distortional aberration increases from a state of the intermediate focal length to the telescopic side. It is also not preferable that the lens groups exceed the lower limit of the condition (6) since variations of aberrations due to zooming, particularly, variations of image curves are remarkable and the spherical aberration of the telescopic side is over-corrected.

In a zoom lens system according to a further another mode of the present invention, for advanced specifications and performance demanded for the zoom lenses for TV cameras, it is preferable that the first lens group is formed to have a negative lens group and at least three positive lens groups and the second lens group is formed to have at least three lens groups in order from the object side.

Particularly for a compact, light-weight construction of the zoom lens system, it is important to reduce the number of lenses which form the first lens group and, if the first lens group can be formed with three groups or less of lenses by utilizing the aspherical surfaces of lenses, a remarkable effect for the above-described light-weight construction can be obtained. However, such reduction of the number of lenses is not preferable since the shape of the aspherical surface in this case will be complicated with considerable deviation from the radius of paraxial curvature of the aspherical surface and undulations and therefore manufacturing of such lens system will be difficult and tolerances including eccentricity will be more strictly specified.

In the present invention, if it is attempted to correct a bobbin type distortional aberration by a group of lenses with negative refractive power, the aberration tends to be under-corrected because of a large spherical aberration at the telescopic side. Therefore it is preferable to provide at least one aspherical surface on one of the negative lens group and the positive lens group, which is located nearest to the object side, of the first lens group. The spherical aberration at the telescopic side can be preferably corrected by the aspherical surfaces of the negative lens group itself and the nearby positive lens group.

In the present invention, the negative lens group of the first lens group is preferably formed to satisfy the following conditional equation.

$$-1.0 < (R_2+R_1)/(R_2-R_1) < -0.1 \qquad (7)$$

where, $R_1$: Radius of paraxial curvature of the lens surface nearest to the object side of the negative lens group $L_{11}$.

$R_2$: Radius of paraxial curvature of the lens surface nearest to the image side of the negative lens group $L_{11}$.

It is not preferable that the negative lens group $L_{11}$ exceeds the upper limit of the condition (7) since the spherical aberration at the telescopic side is under-corrected. In this case, the amount of the aspherical surface should be large for proper correction of this spherical aberration and manufacturing is difficult. It is also not preferable that the negative lens group $L_{11}$ exceeds the lower limit of the condition (7) since the bobbin type distortional aberration increases.

A zoom lens system according to a further another mode of the present invention is formed to include the following lens groups in order from the object side:

a first lens group with positive refractive power;

a second lens group with negative refractive power;

a third lens group with negative refractive power; and a fourth lens group with positive refractive power In this case, for changing a focal length from a wide-end to a telephoto-end, the second lens group is moved along the optical axis from the object side to the image side and the third lens group is moved to reciprocate along the optical axis;

at least one of the first and second lens groups has an aspherical lens surface;

the aspherical lens surface provided in the first lens group is formed to gradually increase the negative refractive power or gradually decrease the positive refractive power from the optical axis toward the periphery; and the aspherical lens surface provided in the second lens group is formed to gradually increase the positive refractive power or gradually decrease the negative refractive power from the optical axis toward the periphery.

The zoom lens system according to the present invention is preferably formed to satisfy the following condition.

$$0.6 < F_T^{1/2} \cdot f_1 / f_T < 0.9 \qquad (8)$$

where, $f_T$: Resultant focal length of the overall system at the telephoto-end.

$F_T$: F number at the telephoto-end $f_1$: Focal length of the first lens

The above condition (8) specifies the optimum power of the variable power portion of the zoom lens to down-size the variable power portion while maintaining the image forming performance. Thus the range of power of the optimum variable power portion can be specified in accordance with the zooming ratio and the maximum aperture ratio of the zoom lens.

It is not preferable that the power of the variable power portion exceeds the upper limit of the condition (8) since it is difficult to attain down-sizing of the variable power portion. It is also not preferable that the lower limit of the condition (8) is exceeded since a resultant deterioration of the aberrations is remarkable even though down-sizing may be made effective. It is not preferable that the powers of particularly the second and third lens groups are increased since the Petzval's sum will deteriorate, a virtual F number at the telescopic side of the first lens group will be excessively small and it will be difficult to correct the spherical aberration at the telescopic side. In addition, tolerances in manufacturing will be more strict and the image quality will remarkably deteriorate due to eccentricity of the lenses.

The zoom lens system preferably satisfies the following condition.

$$0.9 < |\beta_{2W} \cdot V^{1/2}| < 1.3 \qquad (9)$$

where, $\beta_{2W}$: Magnification at the wide-end of the second lens group

V: Zooming ratio

This condition (9) is a condition for satisfactorily maintaining the Petzval's sum. Accordingly, the power of the second lens group can be made relatively small despite that it is attempted to down-size the variable power portion according to the condition (8) and therefore deterioration of the Petzval's sum can be prevented. In a positive/negative/negative/positive type zoom lens according to the present invention, the power of the second lens group tends to be strongest in the lens groups and it is therefore most effective for maintaining the Petzval's sum at an appropriate value to decrease the negative refractive power of the second lens group wherever possible.

The following describes in detail the above, referring to FIG. 15. FIG. 15 shows a schematic diagram of magnification of the second lens group $G_2$. In FIG. 15, P denotes a position of image points in the first lens group $G_1$, that is, the object points for the second lens group $G_2$ and Q denotes a locus of image points formed by the second lens group $G_2$.

If a range of $W_0$-$T_0$, where the magnifications at the wide-end and the telephoto-end of the second lens group $G_2$ are $-1/v^{1/2}$ and $-v^{1/2}$, respectively, is selected as the reference magnification changing range, assuming the magnification changing ratio of the second lens group $G_2$ as v, the positions of image points Q are aligned at the wide-end and the telephoto-end and the positions in the third lens group $G_3$ are aligned. In this case, the magnification changing ratio v of the second lens group $G_2$ is equal to the zooming ratio V.

If a space required to avoid mechanical interference of the lens groups at the wide-end where the first lens group $G_1$ and the second lens group $G_2$ approach closest to each other is assumed as $\Delta$, there is a relationship between magnification $\beta_{2W}$ and focal length $f_2$ of the second lens group $G_2$, as shown below:

$$f_2 = (f_1 - \Delta) \cdot \beta_{2W}/(1 - \beta_{2W}) \qquad (10)$$

It is obvious from this equation that, $\beta_{2W}$ is set to be larger than $-1/v^{1/2}$, $|f_2|$ becomes large and the power of the second lens group $G_2$ is decreased. This corresponds to that the magnification changing range of the second lens group $G_2$ is selected to W-T lower than the reference magnification changing range $W_0$-$T_0$ in FIG. 15. In the present invention, if the magnification changing range of the second lens group $G_2$ is set within the condition (9), the negative refractive power of the second lens group $G_2$ can be decreased.

In this case, it is not preferable that the magnification changing range exceeds the lower limit of the condition (9) since the refractive power of the second lens group $G_2$ is increased and deterioration of the Petzval's sum cannot be avoided.

It is also not preferable that the magnification changing range exceeds the upper limit of the condition (9) since a movable space necessary for varying the focal length of the second lens group $G_2$ becomes large, the overall length of the lens system and the diameter of the front lens increase, the ratio of movement of the third lens group $G_3$ to movement of the second lens group at a point near the telephoto-end in zooming is extremely large, and the mechanism of the bodytube for moving both lens groups is defective.

In the zoom lens system according to the present invention, it is preferable that the third and fourth lens groups have the following constructions to satisfactorily correct the aberrations and maintain a high performance despite that a large aperture ratio is provided.

It is preferable to form the third lens group with negative lens components which are made up by combining a biconcave negative lens component and a biconvex positive lens component.

It is preferable that the fourth lens group is formed by a front lens group which has a meniscus-shaped positive lens component the convex surface of which is faced to the image side, a biconvex positive lens component, and a negative lens component which has the lens surface with a larger curvature faced to the biconvex positive lens component and the object side and cemented with this biconvex positive lens component, and a rear lens group which has a biconvex positive lens component, two cemented lens components and a positive lens component which has a lens surface with a larger curvature is faced to the object side, in this order from the object side.

DETAILED DESCRIPTION OF THE PREFERRED EMBODIMENTS

The preferred embodiments according to the present invention are described, referring to the accompanying drawings.

[First Embodiment]

Figure 1:
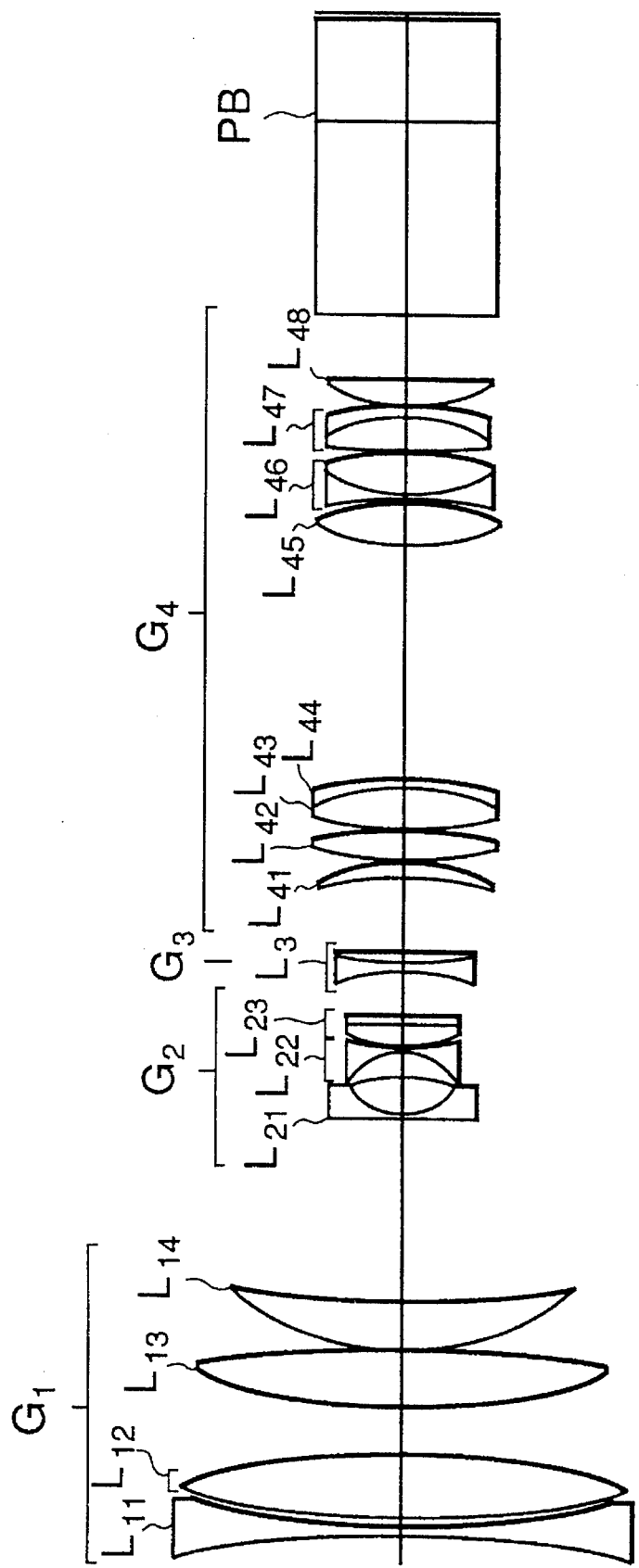
FIG. 1 is a lens construction view of a first embodiment according to the present invention.

Referring to FIG. 1, there is shown a lens construction of a zoom lens system of a first embodiment according to the present invention. In FIG. 1, the zoom lens system of the first embodiment has a first lens group $G_1$ with a positive refractive power, a second lens group $G_2$ with a negative refractive power, a third lens group $G_3$ with a negative refractive power and a fourth lens group $G_4$ with a positive refractive power in this order from an object side. In FIG. 1, a plane parallel plate which includes a color separating prism arranged between a lens surface of the zoom lens, which is faced to the image side, and an image, and filters, is shown as a prism block PB.

The zoom lens system of this embodiment is arranged for varying the focal length from a wide-end to a telephoto-end so that the first lens group $G_1$ and the fourth lens group $G_4$ are fixed for the optical axis direction, the second lens group $G_2$ is simply delivered to the object side along the optical axis, and the third lens group $G_3$ is moved to reciprocate on the optical axis.

In the zoom lens system of this embodiment, the first lens group $G_1$ comprises a biconcave negative lens $L_{11}$, a biconvex positive lens $L_{12}$, a biconvex positive lens $L_{13}$ with a lens surface having a larger curvature faced to the object side, and a meniscus-shaped positive lens $L_{14}$ the convex surface of which is faced to the object side, in this order from the object side. In this embodiment, an aspherical surface layer which is provided on the lens surface of the positive lens $L_{12}$ faced to the object side and the object side surface of which is formed in an aspherical shape is simultaneously shown.

The second lens group $G_2$ has a meniscus-shaped negative lens $L_{21}$ the convex surface of which is faced to the object side, a cemented lens $L_{22}$ which comprises a meniscus-shaped positive lens the convex surface of which is faced to the image side and a biconcave negative lens, and a cemented lens $L_{23}$ which comprises a biconvex positive lens and a biconcave negative lens in this order from the object side.

The third lens group $G_4$ has a cemented lens $L_{11}$ which comprises a biconcave negative lens and a biconvex positive lens in this order from the object side.

The fourth lens group $G_4$ has a meniscus-shaped positive lens $L_{41}$ the convex surface of which is faced to the image side, a biconvex positive lens $L_{42}$, a cemented lens which comprises a biconvex positive lens $L_{43}$ and a meniscus-shaped negative lens $L_{44}$ the convex surface of which is faced to the image side, a biconvex positive lens $L_{45}$, a cemented lens $L_{46}$ which comprises a biconcave negative lens and a biconvex positive lens, a cemented lens $L_{47}$ which comprises a biconvex positive lens and a meniscus-shaped negative lens the convex surface of which is faced to the image side, and a biconvex positive lens $L_{48}$ the convex surface of which has a stronger refractive power and is faced to the object side, in this order from the object side.

The specifications according to this embodiment are shown in Table 1. In the specifications table for the embodiment, f denotes a focal length and F denotes the F number. Numerals in the extreme left denote the order numbers of lenses from the object side, r is a radius of curvature of a lens surface, d is a clearance between lens surfaces, and n and ν are respectively the values in reference to the refractive index and the Abbe's number for the D line ($\lambda$=587.6 nm). Since the aberrations of the zoom lens system according to the present invention are corrected including the prism block PB showing the plane parallel plate which includes the color separating prism and filters in the zoom lens system according to the present invention, the specifications for these components are also shown.

The aspherical profile is expressed by an equation given below, assuming that a radius of paraxial curvature of the aspherical surface is r, a conic constant and aspherical coefficients are A, B, C and D, respectively in the coordinate system in which the vertex of the aspherical surface is set at the origin, the optical axis is set on the X axis and a line which passes through the origin and orthogonally intersects the X axis is set on the Y axis:

$$X = y^2 \cdot r^{-1} \cdot \{1 + [1 - (1+k)(y/r)^2]^{1/2}\}^{-1} + Ay^4 + By^6 + Cy^8 + Dy^{10} \qquad (11)$$

TABLE 1 f = 8.75–127
F = 1.72–2.25

| | r | d | ν | n |
|---|---|---|---|---|
| 1 | −241.699 | 1.90 | 25.4 | 1.80518 |
| 2 | 173.651 | 0.77 | | |
| 3 | 155.343 | 0.03 | 56.3 | 1.49521 |
| 4 | 155.343 | 11.10 | 95.0 | 1.43875 |
| 5 | −118.360 | 7.17 | | |
| 6 | 104.479 | 9.20 | 67.9 | 1.59319 |
| 7 | −283.903 | 0.10 | | |
| 8 | 47.144 | 8.10 | 67.9 | 1.59319 |
| 9 | 175.721 | d9 | | |
| 10 | 119.623 | 0.90 | 35.8 | 1.90265 |
| 11 | 12.045 | 5.70 | | |
| 12 | −41.136 | 3.60 | 23.0 | 1.86074 |
| 13 | −13.200 | 0.90 | 52.3 | 1.74810 |
| 14 | 41.306 | 0.10 | | |
| 15 | 21.702 | 4.40 | 30.8 | 1.61750 |
| 16 | −281.786 | 1.00 | 43.3 | 1.84042 |
| 17 | 125.259 | d17 | | |
| 18 | −25.480 | 0.90 | 46.4 | 1.80411 |
| 19 | 48.765 | 2.60 | 23.0 | 1.86074 |
| 20 | −191.637 | d20 | | |
| 21 | −65.937 | 2.95 | 65.8 | 1.46450 |
| 22 | −30.749 | 0.10 | | |
| 23 | 63.117 | 4.10 | 65.8 | 1.46450 |
| 24 | −115.594 | 0.10 | | |
| 25 | 57.813 | 7.10 | 65.8 | 1.46450 |
| 26 | −37.210 | 1.20 | 39.8 | 1.86994 |
| 27 | −83.331 | 36.88 | | |
| 28 | 37.021 | 6.40 | 65.8 | 1.46450 |
| 29 | −55.587 | 0.70 | | |
| 30 | −76.620 | 1.00 | 39.8 | 1.86994 |
| 31 | 28.748 | 6.90 | 65.8 | 1.46450 |
| 32 | −52.949 | 0.10 | | |
| 33 | 154.781 | 5.50 | 56.5 | 1.50137 |
| 34 | −26.926 | 1.00 | 43.3 | 1.84042 |
| 35 | −91.574 | 0.10 | | |
| 36 | 29.882 | 4.60 | 65.8 | 1.46450 |
| 37 | −506.120 | 10.00 | | |
| 38 | 0.000 | 30.00 | 38.1 | 1.60342 |
| 39 | 0.000 | 16.20 | 64.1 | 1.51680 |
| 40 | 0.000 | 1.23 | | |

(Variable clearance in varying the focal length)

| f | 8.75 | 40 | 127 |
|---|---|---|---|
| d9 | 0.5664 | 30.1640 | 39.6122 |
| d17 | 41.3281 | 7.6530 | 5.7641 |
| d20 | 7.2725 | 11.3500 | 3.7907 |

(Aspherical coefficients)
Third Surface:

k = 0.0000
A = −3.9124 × 10$^{-7}$
B = 3.2071 × 10$^{-11}$
C = −1.8226 × 10$^{-14}$
D = 0.0000
| xa(h) − x(h) | = 0.603 mm (h = 35.5 mm)

(Values corresponding to the conditions)

| (1) | 1.699×10$^{-2}$ |
| (2) | −0.164 |
| (8) | 0.704 |
| (9) | 1.166 |

[Second Embodiment]

Figure 2:
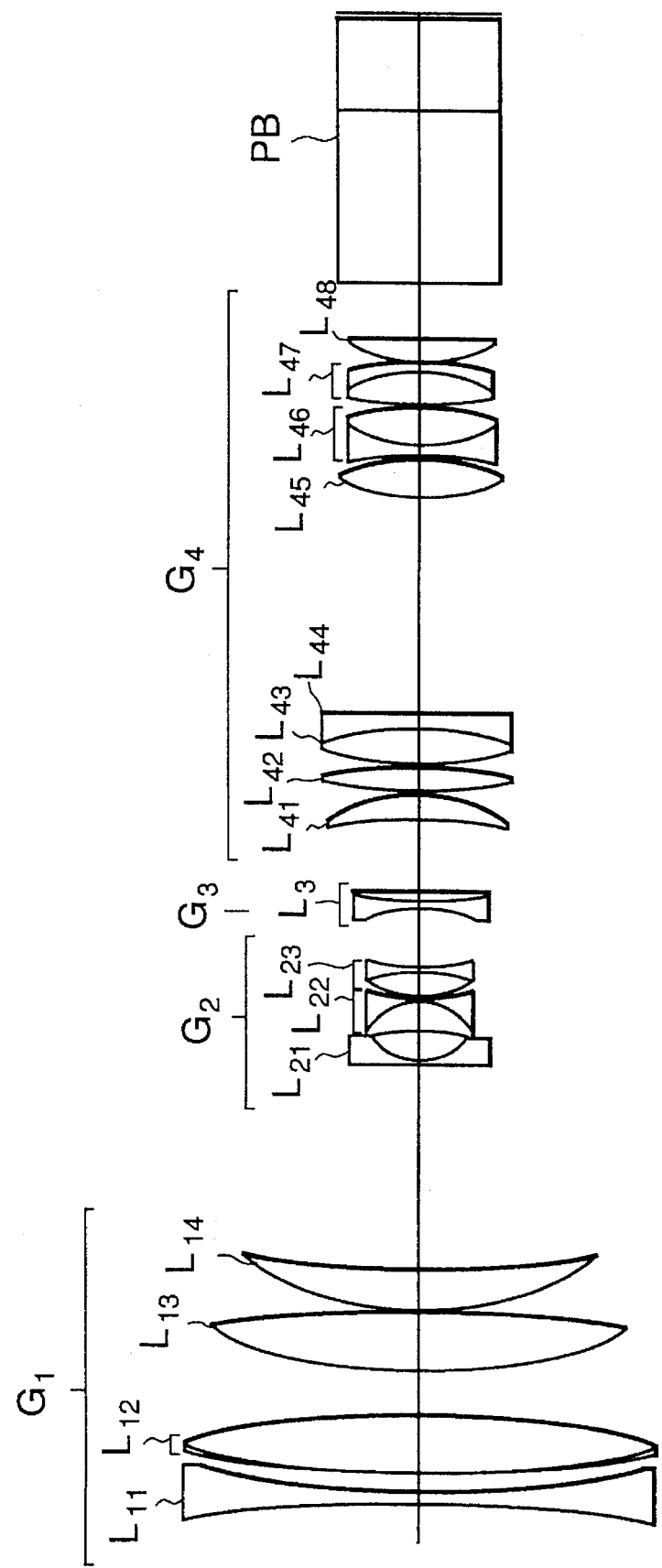
FIG. 2 is a lens construction view of a second embodiment according to the present invention.

A second embodiment according to the present invention is described, referring to FIG. 2. FIG. 2 is a lens construction diagram of a zoom lens system of the second embodiment.

The construction of the fourth lens group $G_4$ of the second embodiment shown in FIG. 2 differs from that of the first embodiment shown in FIG. 1. In this embodiment, only the construction of the fourth lens group $G_4$ is described in detail to simplify the description. The fourth lens group $G_4$ has a meniscus-shaped positive lens $L_{41}$ the convex surface of which is faced to the image side, a biconvex positive lens $L_{42}$, a cemented lens which comprises a biconvex positive lens $L_{43}$ and a biconcave negative lens $L_{44}$, a biconvex positive lens $L_{45}$, a cemented lens $L_{46}$ which comprises a biconcave negative lens and a biconvex positive lens, a cemented lens $L_{47}$ which comprises a biconvex positive lens and a meniscus-shaped negative lens the convex surface of which is faced to the image side, and a biconvex positive lens $L_{48}$ the convex surface of which has a larger refractive power and is faced to the object side, in this order from the object side.

The specifications according to this embodiment are shown in Table 1. In the specifications table for the embodiment, f denotes a focal length and F denotes the F number. Numerals in the extreme left denote the order numbers of lenses from the object side, r is a radius of curvature of a lens surface, d is a clearance between lens surfaces, and n and ν are respectively the values in reference to the refractive index and the Abbe's number for the D line ($\lambda=587.6$ nm). The aspherical profile is expressed by the above equation (11). Since the aberrations of the zoom lens system according to the present invention are corrected including the prism block PB showing the plane parallel plate which includes the color separating prism and filters in the zoom lens system according to the present invention, the specifications for these components are also shown.

TABLE 2 f = 8.27–159.5
F = 1.81–2.45

| | r | d | ν | n |
|---|---|---|---|---|
| 1 | −319.712 | 1.90 | 25.4 | 1.80518 |
| 2 | 178.861 | 2.35 | | |
| 3 | 145.496 | 0.11 | 56.3 | 1.49521 |
| 4 | 145.496 | 12.50 | 95.0 | 1.43875 |
| 5 | −168.884 | 6.96 | | |
| 6 | 100.108 | 11.10 | 67.9 | 1.59319 |
| 7 | −295.247 | 0.09 | | |
| 8 | 57.607 | 8.30 | 67.9 | 1.59319 |
| 9 | 173.592 | d9 | | |
| 10 | 73.633 | 0.81 | 35.8 | 1.90265 |
| 11 | 12.090 | 5.70 | | |
| 12 | −53.922 | 4.80 | 23.0 | 1.86074 |
| 13 | −13.650 | 1.00 | 46.4 | 1.80411 |
| 14 | 68.093 | 0.10 | | |
| 15 | 20.390 | 5.00 | 30.8 | 1.61750 |
| 16 | −30.000 | 0.81 | 39.8 | 1.86994 |
| 17 | 65.662 | d17 | | |
| 18 | −27.543 | 0.81 | 43.3 | 1.84042 |
| 19 | 51.000 | 3.20 | 23.0 | 1.86074 |
| 20 | −138.389 | d20 | | |
| 21 | −105.322 | 4.70 | 64.1 | 1.51680 |
| 22 | −30.168 | 0.10 | | |
| 23 | 54.182 | 5.20 | 70.1 | 1.51860 |
| 24 | −115.102 | 0.10 | | |
| 25 | 50.239 | 6.70 | 65.8 | 1.46450 |
| 26 | −54.000 | 2.00 | 39.8 | 1.86994 |
| 27 | 561.007 | 38.25 | | |
| 28 | 41.485 | 6.10 | 65.8 | 1.46450 |
| 29 | −45.254 | 0.70 | | |
| 30 | −55.060 | 1.50 | 39.8 | 1.86994 |

TABLE 2-continued

| 31 | 27.738 | 7.00 | 64.1 | 1.51680 |
|---|---|---|---|---|
| 32 | −57.220 | 0.10 | | |
| 33 | 78.228 | 6.10 | 40.8 | 1.58144 |
| 34 | −27.233 | 1.50 | 39.8 | 1.86994 |
| 35 | −4389.240 | 0.10 | | |
| 36 | 35.109 | 5.50 | 65.8 | 1.46450 |
| 37 | −68.189 | 10.00 | | |
| 38 | 0.000 | 30.00 | 38.1 | 1.60342 |
| 39 | 0.000 | 16.20 | 64.1 | 1.51680 |
| 40 | 0.000 | 1.27 | | |

(Variable clearance in varying the focal length)

| f | 8.27 | 40 | 159.5 |
|---|---|---|---|
| d9 | 0.5718 | 35.7308 | 47.9889 |
| d17 | 52.0518 | 10.3298 | 5.3941 |
| d20 | 5.7830 | 12.3460 | 5.0236 |

(Aspherical coefficients)
Third Surface:

k = −3.9093
A = −1.6643 × 10$^{-7}$
B =   2.1587 × 10$^{-11}$
C = −2.7964 × 10$^{-14}$
D =   7.4360 × 10$^{-18}$
| xa(h) − x(h) | = 0.858 mm (h = 40.4 mm)

(Values corresponding to the conditions)

| (1) | 2.124×10$^{-2}$ |
|---|---|
| (2) | −0.283 |
| (8) | 0.676 |
| (9) | 1.029 |

[Third Embodiment]

Figure 3:
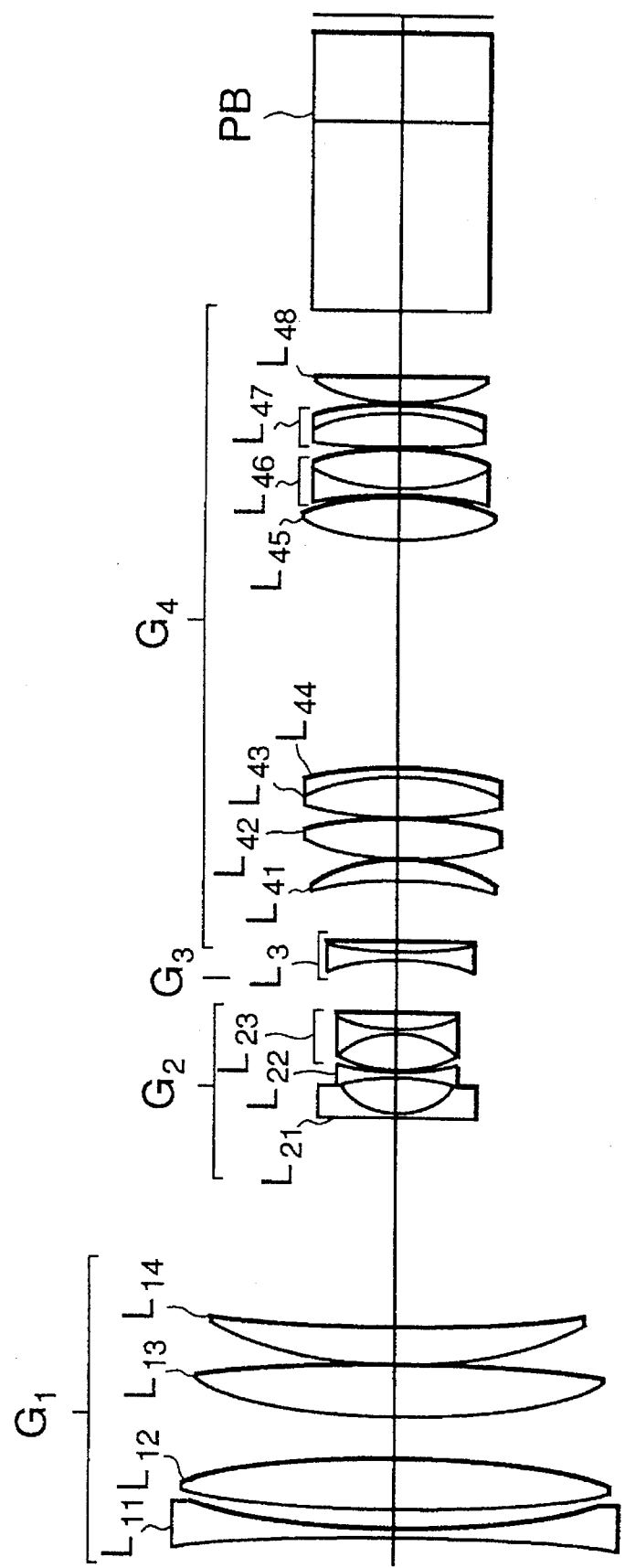
FIG. 3 is a lens construction view of a third embodiment according to the present invention.

A third embodiment according to the present invention is described, referring to FIG. 3. FIG. 3 is a lens construction diagram of a zoom lens system of the third embodiment.

In the zoom lens system of the third embodiment shown in FIG. 3, the first lens group $G_1$ comprises a biconcave negative lens $L_{11}$, a biconvex positive lens $L_{12}$, a biconvex positive lens $L_{13}$ with a lens surface having a larger curvature faced to the object side, and a meniscus-shaped positive lens $L_{14}$ the convex surface of which is faced to the object side, in this order from the object side. In this embodiment, a lens surface at the image side of the negative lens $L_{11}$ is formed in an aspherical shape.

The second lens group $G_2$ has a meniscus-shaped negative lens $L_{21}$ the convex surface of which is faced to the object side, a cemented lens $L_{22}$ which comprises a meniscus-shaped positive lens the convex surface of which is faced to the image side and a biconcave negative lens, and a cemented lens $L_{23}$ which comprises a biconvex positive lens, a biconcave negative lens and a meniscus-shaped positive lens the convex surface of which is faced to the object side, in this order from the object side.

The third lens group $G_3$ has a cemented lens $L_3$ which comprises a biconcave negative lens and a biconvex positive lens as the first embodiment shown in FIG. 1.

The fourth lens group $G_4$ has a meniscus-shaped positive lens $L_{41}$ the convex surface of which is faced to the image side, a biconvex positive lens $L_{42}$, a cemented lens which comprises a biconvex positive lens $L_{43}$ and a meniscus-shaped negative lens $L_{44}$ the convex surface of which is faced to the image side, a biconvex positive lens $L_{45}$, a cemented lens $L_{46}$ which comprises a biconcave negative lens and a biconvex positive lens, a cemented lens $L_{47}$ which comprises a biconvex positive lens and a meniscus-shaped negative lens the convex surface of which is faced to the image side, and a meniscus-shaped positive lens $L_{48}$ the convex surface of which is faced to the object side, in this order from the object side.

The specifications according to this embodiment are shown in Table 3. In the specifications table for the embodiment, f denotes a focal length and F denotes the F number. Numerals in the extreme left denote the order numbers of lenses from the object side, r is a radius of curvature of a lens surface, d is a clearance between lens surfaces, and n and ν are respectively the values in reference to the refractive index and the Abbe's number for the D line (λ=587.6 nm). The aspherical profile is expressed by the above equation (11). Since the aberrations of the zoom lens system according to the present invention are corrected including the prism block PB showing the plane parallel plate which includes the color separating prism and filters also in the zoom lens system according to the present invention, the specifications for these components are shown simultaneously.

TABLE 3 f = 8.75–127
F = 1.72–2.14

|   | r | d | ν | n |
|---|---|---|---|---|
| 1 | −463.573 | 1.90 | 23.8 | 1.84666 |
| 2 | 169.459 | 2.92 | | |
| 3 | 173.949 | 9.40 | 95.0 | 1.43875 |
| 4 | −153.059 | 6.60 | | |
| 5 | 100.473 | 8.70 | 82.6 | 1.49782 |
| 6 | −426.442 | 0.10 | | |
| 7 | 58.402 | 7.40 | 52.3 | 1.74810 |
| 8 | 208.448 | d8 | | |
| 9 | 46.891 | 0.90 | 35.8 | 1.90265 |
| 10 | 11.997 | 6.00 | | |
| 11 | −44.559 | 0.90 | 52.3 | 1.74810 |
| 12 | 44.192 | 0.10 | | |
| 13 | 20.361 | 6.50 | 30.8 | 1.61750 |
| 14 | −15.272 | 0.90 | 46.4 | 1.80411 |
| 15 | 50.617 | 2.20 | 23.0 | 1.86074 |
| 16 | 24916.973 | d16 | | |
| 17 | −24.915 | 0.90 | 52.3 | 1.74810 |
| 18 | 54.346 | 2.70 | 23.0 | 1.86074 |
| 19 | −400.129 | d19 | | |
| 20 | −68.073 | 3.60 | 65.8 | 1.46450 |
| 21 | −27.589 | 0.10 | | |
| 22 | 52.986 | 5.40 | 70.2 | 1.48749 |
| 23 | −88.727 | 0.10 | | |
| 24 | 65.278 | 7.10 | 56.5 | 1.50137 |
| 25 | −39.536 | 1.20 | 39.8 | 1.86994 |
| 26 | −175.382 | 36.30 | | |
| 27 | 45.758 | 6.00 | 65.8 | 1.46450 |
| 28 | −56.878 | 0.70 | | |
| 29 | −71.071 | 1.00 | 39.8 | 1.86994 |
| 30 | 32.743 | 7.30 | 70.2 | 1.48749 |
| 31 | −42.526 | 0.10 | | |
| 32 | 157.576 | 5.40 | 49.1 | 1.53172 |
| 33 | −29.546 | 1.00 | 39.8 | 1.86994 |
| 34 | −130.985 | 0.10 | | |
| 35 | 29.193 | 4.40 | 70.2 | 1.48749 |
| 36 | 396.494 | 10.00 | | |
| 37 | 0.000 | 30.00 | 38.1 | 1.60342 |
| 38 | 0.000 | 16.20 | 64.1 | 1.51680 |
| 39 | 0.000 | 2.02 | | |

(Variable clearance in varying the focal length)

| f | 8.75 | 40 | 127 |
|---|---|---|---|
| dB | 0.4287 | 34.0411 | 45.2350 |
| d16 | 48.0608 | 9.5394 | 3.9992 |
| d19 | 5.0260 | 9.9351 | 4.2814 |

(Aspherical coefficients)
Second surface:

k = 0.0000
A = 1.6502 × 10⁻⁷
B = −5.7039 × 10⁻¹²
C = 1.0880 × 10⁻¹⁴

TABLE 3-continued

D = 0.0000
| xa(h) − x(h) | = 0.267 mm (h = 35.15 mm)

(Values corresponding to the conditions)

| (1) | 7.596×10⁻³ |
|---|---|
| (2) | −0.465 |
| (8) | 0.766 |
| (9) | 1.034 |

[Fourth Embodiment]

Figure 4:
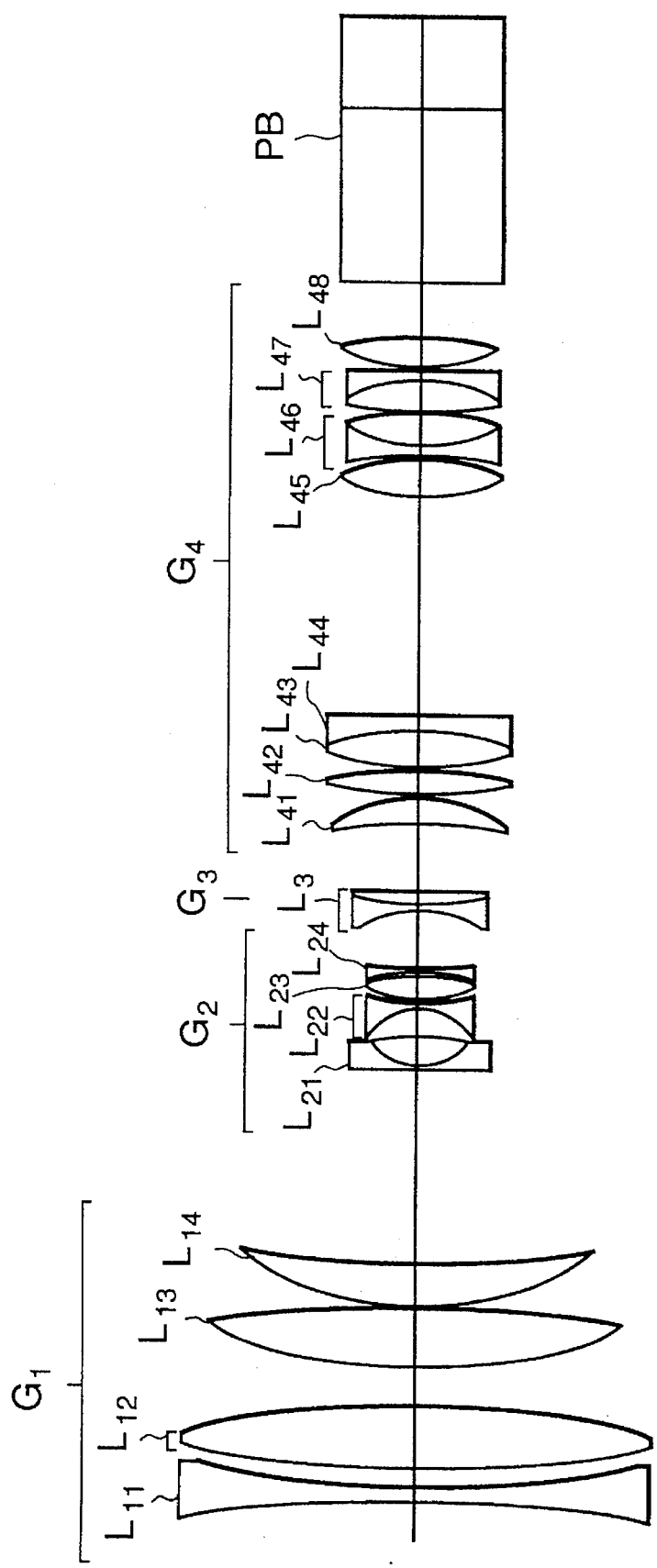
FIG. 4 is a lens construction view of a fourth embodiment according to the present invention.

A fourth embodiment according to the present invention is described, referring to FIG. 4. FIG. 4 is a lens construction diagram of the zoom lens system of the fourth embodiment.

The constructions of the second lens group $G_2$ and the fourth lens group $G_4$ of the fourth embodiment differ from those of the first embodiment shown in FIG. 1. In this embodiment, only the constructions of the second lens group $G_2$ and the fourth lens group $G_4$ are described in detail to simplify the description.

The second lens group $G_2$ has a meniscus-shaped negative lens $L_{21}$ the convex surface of which is faced to the object side, a cemented lens $L_{22}$ which comprises a meniscus-shaped positive lens the convex surface of which is faced to the image side and a biconcave negative lens, a biconvex positive lens $L_{23}$, and a biconcave negative lens $L_{24}$, in this order from the object side.

The fourth lens group $G_4$ has a meniscus-shaped positive lens $L_{41}$ the convex surface of which is faced to the image side, a biconvex positive lens $L_{42}$, a cemented lens which comprises a biconvex positive lens $L_{43}$ and a biconcave negative lens $L_{44}$, a biconvex positive lens $L_{45}$, a cemented lens $L_{46}$ which comprises a biconcave negative lens and a biconvex positive lens, a cemented lens $L_{L47}$ which comprises a biconvex positive lens and a meniscus-shaped negative lens the convex surface of which is faced to the image side, and a biconvex positive lens $L_{48}$ the convex surface of which has a larger refractive power and is faced to the object side, in this order from the object side.

The specifications according to this embodiment are shown in Table 4. In the specifications table for the embodiment, f denotes a focal length and F denotes the F number. Numerals in the extreme left denote the order numbers of lenses from the object side, r is a radius of curvature of a lens surface, d is a clearance between lens surfaces, and n and ν are respectively the values in reference to the refractive index and the Abbe's number for the D line (λ=587.6 nm). The aspherical profile is expressed by the above equation (6). Since the aberrations of the zoom lens system according to the present invention are corrected including the prism block PB showing the plane parallel plate which includes the color separating prism and filters also in the zoom lens system according to the present invention, the specifications for these components are simultaneously shown.

TABLE 4 f = 8.27–159.5
F = 1.82–2.47

|   | r | d | ν | n |
|---|---|---|---|---|
| 1 | −324.633 | 1.90 | 25.4 | 1.80518 |
| 2 | 178.751 | 2.38 | | |
| 3 | 146.749 | 0.18 | 56.3 | 1.49521 |
| 4 | 167.000 | 12.50 | 95.0 | 1.43875 |
| 5 | −172.495 | 7.05 | | |
| 6 | 103.251 | 11.30 | 67.9 | 1.59319 |

TABLE 4-continued

| | | | | |
|---|---|---|---|---|
| 7 | −278.818 | 0.10 | | |
| 8 | 57.276 | 8.00 | 67.9 | 1.59319 |
| 9 | 174.604 | d9 | | |
| 10 | 82.668 | 0.90 | 35.8 | 1.90265 |
| 11 | 12.559 | 5.90 | | |
| 12 | −55.896 | 4.90 | 23.0 | 1.86074 |
| 13 | −13.105 | 1.00 | 46.4 | 1.80411 |
| 14 | 46.504 | 0.10 | | |
| 15 | 22.308 | 4.00 | 30.8 | 1.61750 |
| 16 | −75.517 | 1.00 | | |
| 17 | −38.940 | 0.90 | 39.8 | 1.86994 |
| 18 | 1246.726 | d18 | | |
| 19 | −26.747 | 0.90 | 43.3 | 1.84042 |
| 20 | 52.890 | 3.20 | 23.0 | 1.86074 |
| 21 | −122.969 | d21 | | |
| 22 | −96.093 | 4.70 | 64.1 | 1.51680 |
| 23 | −29.955 | 0.10 | | |
| 24 | 53.879 | 5.20 | 70.1 | 1.51860 |
| 25 | −91.292 | 0.10 | | |
| 26 | 49.318 | 6.70 | 65.8 | 1.46450 |
| 27 | −52.267 | 2.00 | 39.8 | 1.86994 |
| 28 | 337.484 | 38.62 | | |
| 29 | 41.991 | 6.10 | 65.8 | 1.46450 |
| 30 | −44.231 | 0.70 | | |
| 31 | −54.089 | 1.50 | 39.8 | 1.86994 |
| 32 | 28.275 | 6.50 | 64.1 | 1.51680 |
| 33 | −58.027 | 0.10 | | |
| 34 | 77.704 | 5.90 | 40.8 | 1.58144 |
| 35 | −26.696 | 1.50 | 39.8 | 1.86994 |
| 36 | −2043.205 | 0.10 | | |
| 37 | 35.918 | 5.50 | 65.8 | 1.46450 |
| 38 | −65.897 | 10.00 | | |
| 39 | 0.000 | 30.00 | 38.1 | 1.60342 |
| 40 | 0.000 | 16.20 | 64.1 | 1.51680 |
| 41 | 0.000 | 1.32 | | |

(Variable clearance in varying the focal length)

| f | 8.27 | 40 | 159.5 |
|---|---|---|---|
| d9 | 0.5691 | 35.8735 | 48.1413 |
| d18 | 51.9902 | 10.2369 | 5.1862 |
| d21 | 5.7123 | 12.1612 | 4.9441 |

(Aspherical coefficients)
Third Surface:

$k = -3.9077$
$A = -1.6630 \times 10^{-7}$
$B = 2.2118 \times 10^{-11}$
$C = -2.7736 \times 10^{-14}$
$D = 7.4101 \times 10^{-18}$
$| xa(h) - x(h) | = 0.853$ mm (h = 40.5 mm)

(Values corresponding to the conditions)

| | |
|---|---|
| (1) | 2.106×10⁻² |
| (2) | −0.290 |
| (8) | 0.678 |
| (9) | 1.029 |

Fifth to seventh embodiments according to the present invention are described below.

Figure 5:
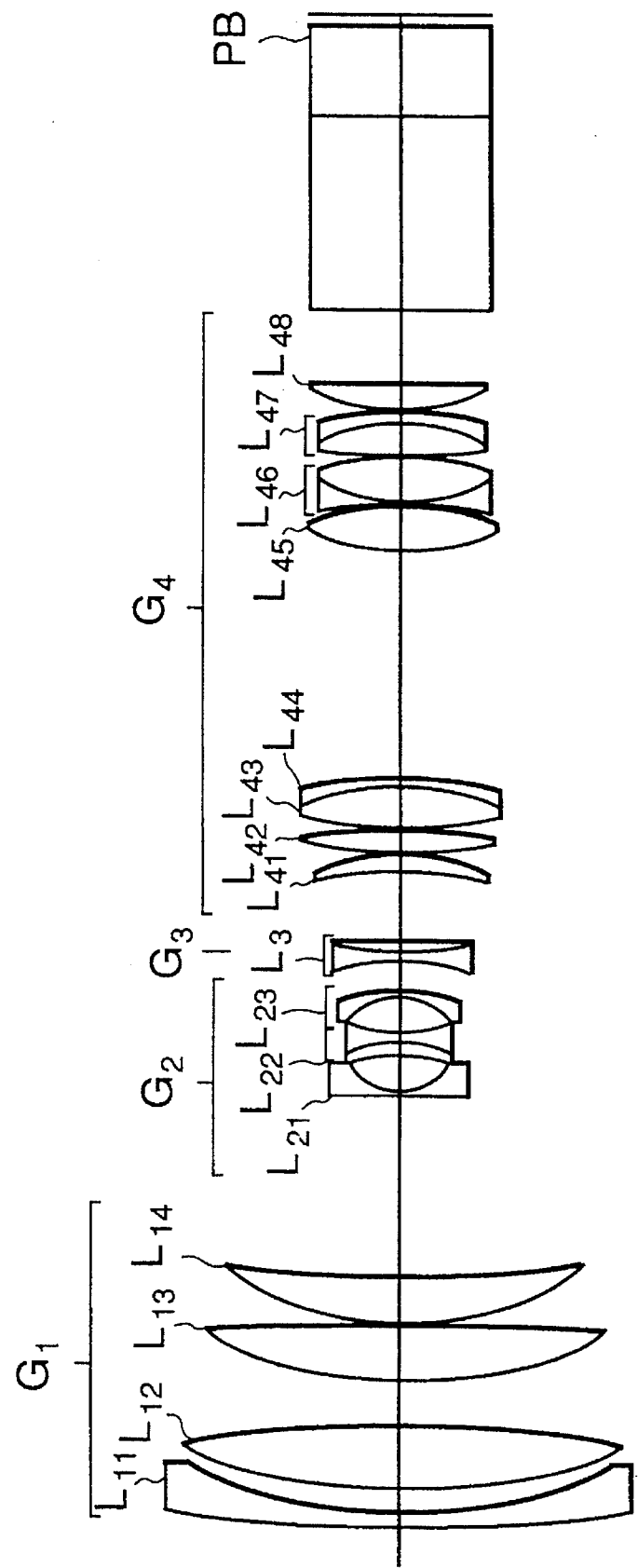
FIG. 5 is a lens construction view of a fifth embodiment according to the present invention.
Figure 6:
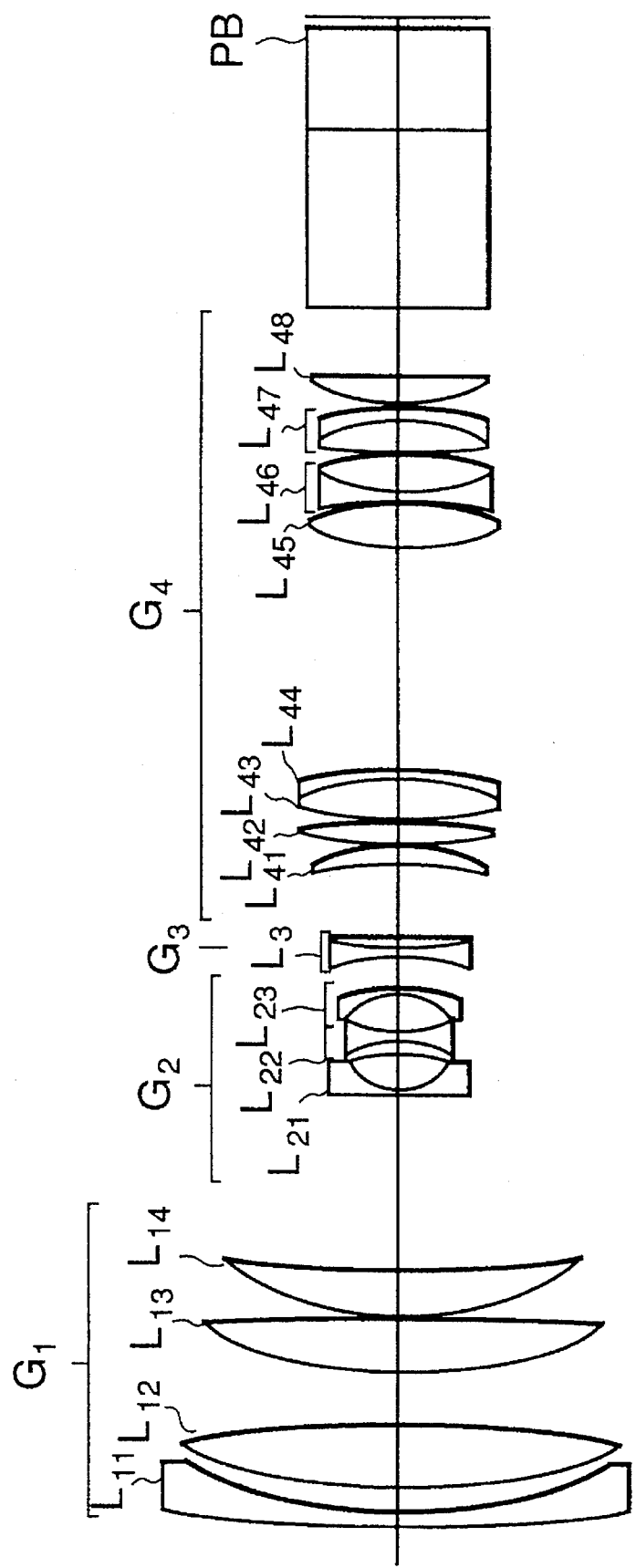
FIG. 6 is a lens construction view of a sixth embodiment according to the present invention.
Figure 7:
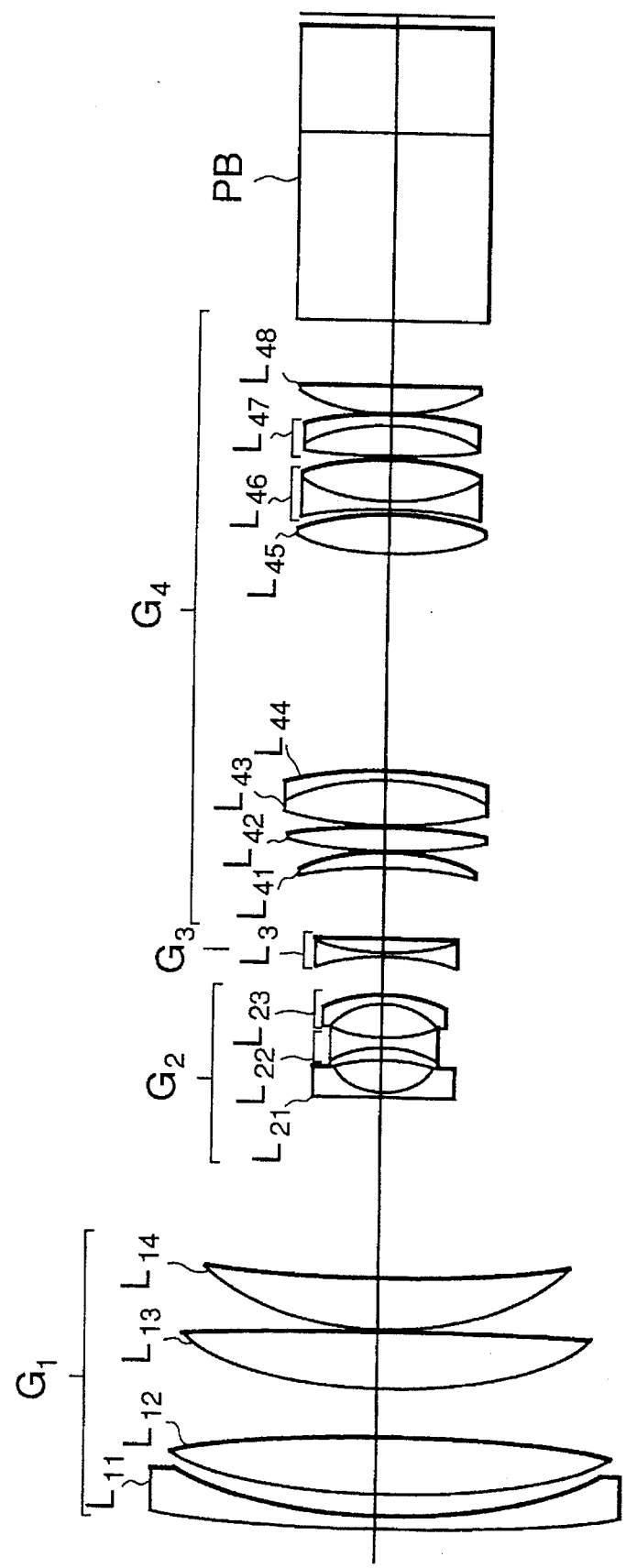
FIG. 7 is a lens construction view of a seventh embodiment according to the present invention.

FIGS. 5 to 7 are respectively a lens construction diagram of the fifth to eighth embodiments. Each of these embodiments has the first lens group $G_1$ with the positive refractive power, the second lens group $G_2$ with the negative refractive power, the third lens group $G_3$ with the negative refractive power, and the fourth lens group $G_4$ with the positive refractive power. The zoom lens system of each of these embodiments is arranged for varying the focal length from a wide-end to a telephoto-end so that the first lens group $G_1$ and the fourth lens group $G_4$ are fixed for the optical axis direction, the second lens group $G_2$ is simply delivered to the object side along the optical axis, and the third lens group $G_3$ is moved to reciprocate on the optical axis. In each embodiment, a plane parallel plate which includes a color separating prism arranged between a lens surface of the zoom lens, which is faced to the image side, and an image, and filters, is shown as a prism block PB.

In the zoom lens systems of the fifth to seventh embodiments, the first lens group $G_1$ comprises a meniscus-shaped negative lens $L_{11}$ the convex surface of which is faced to the object side, a biconvex positive lens $L_{12}$, a biconvex positive lens $L_{13}$ with a lens surface having a larger curvature faced to the object side, and a meniscus-shaped positive lens $L_{14}$ the convex surface of which is faced to the object side, in this order from the object side.

The second lens group $G_2$ has a meniscus-shaped negative lens $L_{21}$ the concave surface of which is faced to the image side, a cemented lens $L_{22}$ which comprises a meniscus-shaped positive lens the concave surface of which is faced to the object side and a biconcave negative lens, and a cemented lens $L_{23}$ which comprises a biconvex positive lens and a meniscus-shaped negative lens the concave surface of which is faced to the object side, in this order from the object side.

In the fifth and sixth embodiments, an aspherical layer the image side surface of which is formed as an aspherical surface is provided on the lens surface nearest to the image side of the cemented lens $L_{22}$. In the seventh embodiment, the lens surface nearest to the image side of the cemented lens $L_{22}$ is formed as an aspherical surface.

The third lens group $G_3$ has a cemented lens $L_3$ which comprises a biconcave negative lens and a biconvex positive lens with a more intense curvature at the object side.

The fourth lens group $G_4$ has a meniscus-shaped positive lens $L_{41}$ the concave surface of which is faced to the object side, a biconvex positive lens $L_{42}$, a cemented lens which comprises a biconvex positive lens $L_{43}$ and a meniscus-shaped negative lens $L_{44}$ the concave surface of which is faced to the object side, a biconvex positive lens $L_{45}$, a cemented lens $L_{46}$ which comprises a biconcave negative lens and a biconvex positive lens, a cemented lens $L_{47}$ which comprises a biconvex positive lens with a more intense curvature at the image side and a meniscus-shaped negative lens the concave surface of which is faced to the object side, and a biconvex positive lens $L_{48}$ with a more intense curvature at the object side, in this order from the object side.

The values of specifications according to this embodiment are shown in Tables 5 to 7. In the specifications tables for these embodiments, f denotes a focal length and F denotes the F number. Numerals in the extreme left denote the order numbers of lenses from the object side, r is a radius of curvature of a lens surface, d is a clearance between lens surfaces, and n and ν are respectively the values in reference to the refractive index and the Abbe's number for the D line (λ=587.6 nm). The aspherical profile is expressed by the above equation (11). Since the aberrations of the zoom lens system according to the present invention are corrected, including the prism block PB showing the plane parallel plate which includes the color separating prism and filters also in the zoom lens system according to the present invention, the specifications for these components are shown simultaneously.

TABLE 5

[Fifth Embodiment]

f = 8.75–127
F = 1.72–2.24

| | r | d | ν | n |
|---|---|---|---|---|
| 1 | 258.520 | 1.90 | 25.4 | 1.80518 |
| 2 | 75.152 | 4.20 | | |
| 3 | 104.187 | 9.80 | 95.0 | 1.43875 |
| 4 | −231.990 | 7.14 | | |
| 5 | 69.494 | 9.60 | 67.9 | 1.59319 |
| 6 | −1086.331 | 0.10 | | |
| 7 | 49.052 | 7.20 | 67.9 | 1.59319 |
| 8 | 141.789 | d8 | | |
| 9 | 207.240 | 0.90 | 35.8 | 1.90265 |
| 10 | 12.285 | 5.15 | | |
| 11 | −32.608 | 2.40 | 23.0 | 1.86074 |
| 12 | −19.442 | 0.90 | 52.3 | 1.74810 |
| 13 | 34.147 | 0.25 | 56.3 | 1.49521 |
| 14 | 34.147 | 0.10 | | |
| 15 | 27.894 | 6.30 | 30.8 | 1.61750 |
| 16 | −12.097 | 1.00 | 43.3 | 1.84042 |
| 17 | −32.704 | d17 | | |
| 18 | −25.915 | 0.90 | 46.4 | 1.80411 |
| 19 | 46.251 | 2.45 | 23.0 | 1.86074 |
| 20 | −218.445 | d20 | | |
| 21 | −64.851 | 2.65 | 65.8 | 1.46450 |
| 22 | −30.855 | 0.10 | | |
| 23 | 63.447 | 3.85 | 65.8 | 1.46450 |
| 24 | −121.631 | 0.10 | | |
| 25 | 55.649 | 7.55 | 65.8 | 1.46450 |
| 26 | −35.301 | 1.70 | 43.3 | 1.84042 |
| 27 | −81.021 | 35.65 | | |
| 28 | 36.304 | 6.40 | 65.8 | 1.46450 |
| 29 | −55.538 | 0.70 | | |
| 30 | −78.120 | 1.50 | 39.8 | 1.86994 |
| 31 | 27.413 | 7.20 | 65.8 | 1.46450 |
| 32 | −52.585 | 0.10 | | |
| 33 | 204.963 | 5.30 | 54.6 | 1.51454 |
| 34 | −27.126 | 1.50 | 39.8 | 1.86994 |
| 35 | −81.659 | 0.10 | | |
| 36 | 29.462 | 4.60 | 65.8 | 1.46450 |
| 37 | −957.377 | 10.00 | | |
| 38 | 0.000 | 30.00 | 38.1 | 1.60342 |
| 39 | 0.000 | 16.20 | 64.1 | 1.51680 |
| 40 | 0.000 | 1.32 | | |

Variable clearance in varying the focal length)

| f | 8.75 | 40 | 127 |
|---|---|---|---|
| d8 | 0.7326 | 30.3323 | 39.7802 |
| d17 | 39.0272 | 5.3495 | 3.4605 |
| d20 | 7.5525 | 11.6305 | 4.0715 |

(Aspherical coefficients)
Fourteenth Surface:

k = 0.0000
A = −3.8436 × $10^{-5}$
B = 1.4528 × $10^{-8}$
C = −7.3974 × $10^{-10}$
D = 0.0000
| xa(h) − x(h) | = 0.215 mm (h = 8.4 mm)

(Values corresponding to the conditions)

| (3) | 2.560×$10^{-2}$ |
|---|---|
| (4) | −1.820 |
| (8) | 0.704 |
| (9) | 1.165 |

TABLE 6

[Sixth embodiment]

f = 8.75–127
F = 1.72–2.21

TABLE 6-continued

| | r | d | ν | n |
|---|---|---|---|---|
| 1 | 277.729 | 1.70 | 25.4 | 1.80518 |
| 2 | 76.574 | 3.93 | | |
| 3 | 108.051 | 10.15 | 95.0 | 1.43875 |
| 4 | −212.484 | 7.75 | | |
| 5 | 69.891 | 9.65 | 67.9 | 1.59319 |
| 6 | −1236.773 | 0.10 | | |
| 7 | 48.906 | 7.35 | 67.9 | 1.59319 |
| 8 | 144.644 | d8 | | |
| 9 | 199.542 | 0.90 | 35.8 | 1.90265 |
| 10 | 12.236 | 5.15 | | |
| 11 | −34.379 | 2.10 | 23.0 | 1.86074 |
| 12 | −19.621 | 0.90 | 52.3 | 1.74810 |
| 13 | 32.672 | 0.25 | 56.3 | 1.49521 |
| 14 | 32.672 | 0.10 | | |
| 15 | 26.707 | 6.20 | 30.8 | 1.61750 |
| 16 | −12.200 | 1.00 | 43.3 | 1.84042 |
| 17 | −33.740 | d17 | | |
| 18 | −25.963 | 0.90 | 46.4 | 1.80411 |
| 19 | 45.823 | 2.45 | 23.0 | 1.86074 |
| 20 | −222.186 | d20 | | |
| 21 | −65.330 | 2.65 | 65.8 | 1.46450 |
| 22 | −31.045 | 0.10 | | |
| 23 | 63.336 | 3.85 | 65.8 | 1.46450 |
| 24 | −120.217 | 0.10 | | |
| 25 | 56.003 | 7.55 | 65.8 | 1.46450 |
| 26 | −35.530 | 1.70 | 43.4 | 1.84042 |
| 27 | −82.313 | 35.63 | | |
| 28 | 36.469 | 6.40 | 65.8 | 1.46450 |
| 29 | −55.715 | 0.70 | | |
| 30 | −78.614 | 1.50 | 39.8 | 1.86994 |
| 31 | 27.358 | 7.20 | 65.8 | 1.46450 |
| 32 | −51.893 | 0.10 | | |
| 33 | 208.934 | 5.30 | 54.6 | 1.51454 |
| 34 | −27.295 | 1.50 | 39.8 | 1.86994 |
| 35 | −83.523 | 0.10 | | |
| 36 | 29.518 | 4.60 | 65.8 | 1.46450 |
| 37 | −907.539 | 10.00 | | |
| 38 | 0.000 | 30.00 | 38.1 | 1.60342 |
| 39 | 0.000 | 16.20 | 64.1 | 1.51680 |
| 40 | 0.000 | 1.32 | | |

(Variable clearance in varying the focal length)

| f | 8.75 | 40 | 127 |
|---|---|---|---|
| d8 | 0.6743 | 30.2148 | 39.6414 |
| d17 | 39.2815 | 5.6739 | 3.8561 |
| d20 | 7.9358 | 12.0029 | 4.3941 |

(Aspherical coefficients)
Fourteenth Surface:

k = 0.0000
A = −3.8757 × $10^{-5}$
B = −1.6642 × $10^{-8}$
C = −7.2796 × $10^{-10}$
D = 0.0000
| xa(h) − x(h) | = 0.223 mm (h = 8.45 mm)

(Values corresponding to the conditions)

| (3) | 2.639×$10^{-2}$ |
|---|---|
| (4) | −1.761 |
| (8) | 0.698 |
| (9) | 1.168 |

TABLE 7

[Seventh Embodiment]

f = 8.75–127
F = 1.72–2.25

| | r | d | ν | n |
|---|---|---|---|---|
| 1 | 259.230 | 1.90 | 25.4 | 1.80518 |
| 2 | 75.039 | 4.14 | | |

TABLE 7-continued

| | | | | |
|---|---|---|---|---|
| 3 | 104.757 | 9.80 | 95.0 | 1.43875 |
| 4 | −226.292 | 7.14 | | |
| 5 | 69.155 | 9.60 | 67.9 | 1.59319 |
| 6 | −1405.961 | 0.10 | | |
| 7 | 49.204 | 7.20 | 67.9 | 1.59319 |
| 8 | 146.850 | d8 | | |
| 9 | 219.850 | 0.90 | 35.8 | 1.90265 |
| 10 | 12.126 | 5.15 | | |
| 11 | −37.160 | 2.30 | 23.0 | 1.86074 |
| 12 | −20.023 | 1.05 | 52.3 | 1.74810 |
| 13 | 34.027 | 0.10 | | |
| 14 | 27.063 | 6.50 | 30.8 | 1.61750 |
| 15 | −12.377 | 1.00 | 43.3 | 1.84042 |
| 16 | −35.592 | d16 | | |
| 17 | −25.915 | 0.90 | 46.4 | 1.80411 |
| 18 | 46.251 | 2.45 | 23.0 | 1.86074 |
| 19 | −218.446 | d19 | | |
| 20 | −64.851 | 2.65 | 65.8 | 1.46450 |
| 21 | −30.855 | 0.10 | | |
| 22 | 63.447 | 3.85 | 65.8 | 1.46450 |
| 23 | −121.631 | 0.10 | | |
| 24 | 55.649 | 7.55 | 65.8 | 1.46450 |
| 25 | −35.301 | 1.70 | 43.3 | 1.84042 |
| 26 | −81.021 | 35.65 | | |
| 27 | 36.304 | 6.40 | 65.8 | 1.46450 |
| 28 | −55.538 | 0.70 | | |
| 29 | −78.120 | 1.50 | 39.8 | 1.86994 |
| 30 | 27.413 | 7.20 | 65.8 | 1.46450 |
| 31 | −52.585 | 0.10 | | |
| 32 | 204.963 | 5.30 | 54.6 | 1.51454 |
| 33 | −27.126 | 1.50 | 39.8 | 1.86994 |
| 34 | −81.659 | 0.10 | | |
| 35 | 29.462 | 4.60 | 65.8 | 1.46450 |
| 36 | −957.332 | 10.00 | | |
| 37 | 0.000 | 30.00 | 38.1 | 1.60342 |
| 38 | 0.000 | 16.20 | 64.1 | 1.51680 |
| 39 | 0.000 | 1.32 | | |

(Variable clearance in varying the focal length)

| f | 8.75 | 40 | 127 |
|---|---|---|---|
| d8 | 0.6978 | 30.2975 | 39.7454 |
| d16 | 39.2759 | 5.5981 | 3.7092 |
| d19 | 7.5525 | 11.6305 | 4.0715 |

(Aspherical coefficients)
Thirteenth Surface:

$k = 0.0000$
$A = -2.7319 \times 10^{-5}$
$B = -1.3187 \times 10^{-8}$
$C = -6.3498 \times 10^{-10}$
$D = 0.0000$
$|xa(h) - x(h)| = 0.161$ mm (h = 8.45 mm)

(Values corresponding to the conditions)

| (3) | $1.905 \times 10^{-2}$ |
|---|---|
| (4) | −1.815 |
| (8) | 0.704 |
| (9) | 1.165 |

Figure 8:
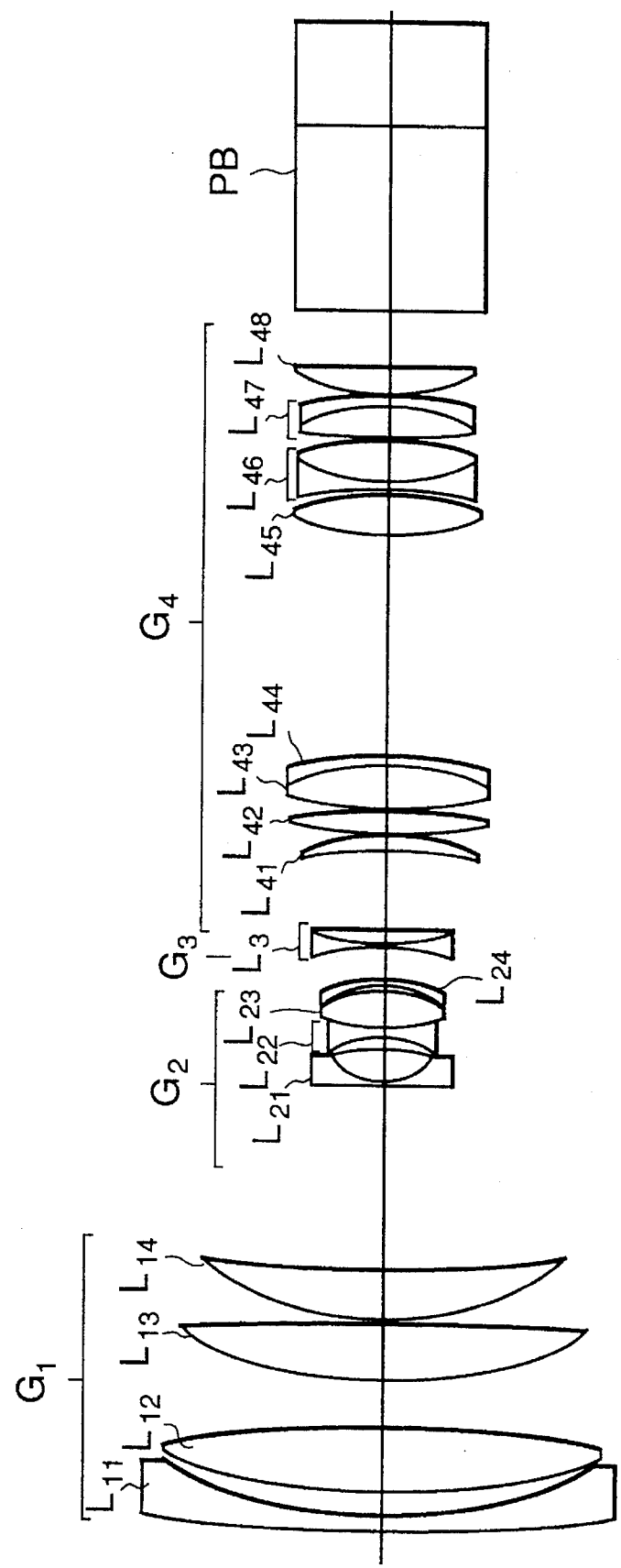
FIG. 8 is a lens construction view of an eighth embodiment according to the present invention.

An eighth embodiment according to the present invention is described, referring to FIG. 8. FIG. 8 is a lens construction diagram of the eighth embodiment.

The construction of the second lens group $G_2$ of the eighth embodiment differs from that of the fifth embodiment. In this embodiment, accordingly, the construction of only the second lens group $G_2$ is described to simplify the description.

In FIG. 8, the second lens group $G_2$ has a meniscus-shaped negative lens $L_{21}$ the concave surface of which is faced to the image side, a cemented lens $L_{22}$ which comprises a meniscus-shaped positive lens the concave surface of which is faced to the object side and a biconcave negative lens, a biconvex positive lens $L_{23}$, and a meniscus-shaped negative lens $L_{24}$ the concave surface of which is faced to the object side, in this order from the object side.

The values of specifications according to this embodiment are shown in Table 8. In the specifications table for this embodiment, f denotes a focal length and F denotes the F number. Numerals in the extreme left denote the order numbers of lenses from the object side, r is a radius of curvature of a lens surface, d is a clearance between lens surfaces, and n and ν are respectively the values in reference to the refractive index and the Abbe's number for the D line (λ=587.6 nm). The aspherical profile is expressed by the above equation (11). Since the aberrations of the zoom lens system according to the present invention are corrected, including the prism block PB showing the plane parallel plate which includes the color separating prism and filters also in the zoom lens system according to the present invention, the specifications for these components are simultaneously shown.

TABLE 8

[Eighth Embodiment]

$f = 8.75-127$
$F = 1.72-2.21$

| | r | d | ν | n |
|---|---|---|---|---|
| 1 | 275.430 | 1.70 | 25.4 | 1.80518 |
| 2 | 76.558 | 3.98 | | |
| 3 | 107.226 | 10.15 | 95.0 | 1.43875 |
| 4 | −218.065 | 7.73 | | |
| 5 | 70.934 | 9.65 | 67.9 | 1.59319 |
| 6 | −1255.712 | 0.10 | | |
| 7 | 48.838 | 7.35 | 67.9 | 1.59319 |
| 8 | 149.387 | d8 | | |
| 9 | 194.056 | 0.90 | 35.8 | 1.90265 |
| 10 | 12.514 | 5.20 | | |
| 11 | −26.114 | 2.50 | 23.0 | 1.86074 |
| 12 | −14.932 | 0.90 | 52.3 | 1.74810 |
| 13 | 43.500 | 0.16 | 56.3 | 1.49521 |
| 14 | 36.157 | 0.10 | | |
| 15 | 30.717 | 5.60 | 30.8 | 1.61750 |
| 16 | −18.277 | 1.10 | | |
| 17 | −14.706 | 1.00 | 43.3 | 1.84042 |
| 18 | −25.603 | d18 | | |
| 19 | −25.963 | 0.90 | 46.4 | 1.80411 |
| 20 | 45.823 | 2.45 | 23.0 | 1.86074 |
| 21 | −222.186 | d21 | | |
| 22 | −65.330 | 2.65 | 65.8 | 1.46450 |
| 23 | −31.045 | 0.10 | | |
| 24 | 63.336 | 3.85 | 65.8 | 1.46450 |
| 25 | −120.217 | 0.10 | | |
| 26 | 56.003 | 7.55 | 65.8 | 1.46450 |
| 27 | −35.530 | 1.70 | 43.3 | 1.84042 |
| 28 | −82.313 | 35.63 | | |
| 29 | 36.469 | 6.40 | 65.8 | 1.46450 |
| 30 | −55.715 | 0.70 | | |
| 31 | −78.614 | 1.50 | 39.8 | 1.86994 |
| 32 | 27.358 | 7.20 | 65.8 | 1.46450 |
| 33 | −51.893 | 0.10 | | |
| 34 | 208.934 | 5.30 | 54.6 | 1.51454 |
| 35 | −27.295 | 1.50 | 39.8 | 1.86994 |
| 36 | −83.523 | 0.10 | | |
| 37 | 29.518 | 4.60 | 65.8 | 1.46450 |
| 38 | −907.535 | 10.00 | | |
| 39 | 0.000 | 30.00 | 38.1 | 1.60342 |
| 40 | 0.000 | 16.20 | 64.1 | 1.51680 |
| 41 | 0.000 | 1.33 | | |

(Variable clearance in varying the focal length)

| f | 8.75 | 40 | 127 |
|---|---|---|---|
| d8 | 0.6738 | 30.2143 | 39.6408 |
| d18 | 38.5731 | 4.9655 | 3.1477 |

TABLE 8-continued

| d21 | 7.9358 | 12.0029 | 4.3941 |
|---|---|---|---|

(Aspherical coefficients)
Fourteenth surface:

k = 0.0000
A = −3.9671 × $10^{-5}$
B = −1.7847 × $10^{-8}$
C = −7.8052 × $10^{-10}$
D = 0.0000
| xa(h) − x(h) | = 0.261 mm (h = 8.7 mm)

(Values corresponding to the conditions)

| (3) | 3.000×$10^{-2}$ |
|---|---|
| (4) | −1.770 |
| (8) | 0.698 |
| (9) | 1.168 |

[Ninth Embodiment]

Figure 9:
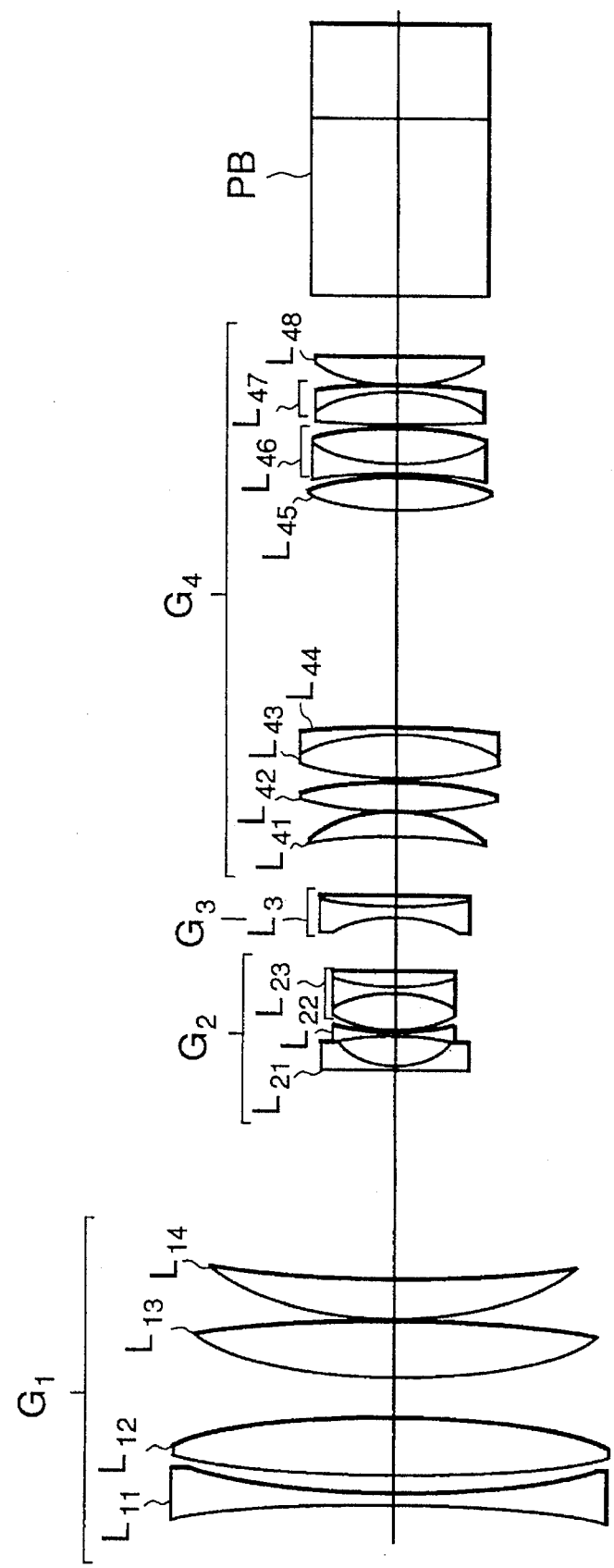
FIG. 9 is a lens construction view of a ninth embodiment according to the present invention.

FIG. 9 is a lens construction diagram of the ninth embodiment according to the present invention. In FIG. 9, the zoom lens system of the ninth embodiment has a first lens group $G_1$ with a positive refractive power, a second lens group $G_2$ with a negative refractive power, a third lens group $G_3$ with a negative refractive power, and a fourth lens group $G_4$ with a positive refractive power, in this order from the object side. In FIG. 9, a color separating prism and a plane parallel plate including filters which are arranged between the lens surface nearest to the image side of the zoom lens system and the image plane are shown as a prism block PB.

The zoom lens system according to the present invention is arranged for varying the focal length from the wide-end to the telephoto-end so that the first lens group $G_1$ and the fourth lens group $G_4$ are fixed for the optical axis direction, the second lens group $G_2$ is simply delivered toward the object side along the optical axis, and the third lens group $G_3$ is moved to reciprocate on the optical axis.

In this embodiment, the first lens group $G_1$ comprises a biconcave negative lens $L_{11}$, a biconvex positive lens $L_{12}$, a biconvex positive lens $L_{13}$ with a lens surface having a more intense curvature faced to the object side, and a meniscus-shaped positive lens $L_{14}$ the convex surface of which is faced to the object side, in this order from the object side. In this case, the lens surface faced to the image side of the negative lens $L_{11}$ is formed in an aspherical shape.

The second lens group $G_2$ has a meniscus-shaped negative lens $L_{21}$ the convex surface of which is faced to the object side, a biconcave negative lens $L_{22}$, and a cemented lens $L_{23}$ which comprises a biconvex positive lens, a biconcave negative lens and a meniscus-shaped positive lens the convex surface of which is faced to the object side, in this order from the object side.

The third lens group $G_3$ has a cemented lens $L_3$ which comprises a biconcave negative lens and a biconvex positive lens with a more intense curvature at the object side, in this order from the object side.

The fourth lens group $G_4$ has a meniscus-shaped positive lens $L_{41}$ the concave surface of which is faced to the object side, a biconvex positive lens $L_{42}$ with a more intense curvature surface faced to the object side, a cemented lens which comprises a biconvex positive lens $L_{43}$ and a meniscus-shaped negative lens $L_{44}$ the concave surface of which is faced to the object side, a biconvex positive lens $L_{45}$, a cemented lens $L_{46}$ which comprises a biconcave negative lens and a biconvex positive lens, a cemented lens $L_{47}$ which comprises a biconvex positive lens and a meniscus-shaped negative lens the concave surface of which is faced to the object side, and a meniscus-shaped convex positive lens $L_{48}$ the convex surface of which is faced to the object side.

The values of specifications according to this embodiment are shown in Table 9. In the specifications table for this embodiment, f denotes a focal length and F denotes the F number. Numerals in the extreme left denote the order numbers of lenses from the object side, r is a radius of curvature of a lens surface, d is a clearance between lens surfaces, and n and ν are respectively the values in reference to the refractive index and the Abbe's number for the D line (λ=587.6 nm). The aspherical profile is expressed by the above equation (11). Since the aberrations of the zoom lens system according to the present invention are corrected including the prism block PB showing the plane parallel plate which includes the color separating prism and filters also in the zoom lens system according to the present invention, the specifications for these components are simultaneously shown.

TABLE 9 f = 8.75–127
F = 1.72–2.13

| | r | d | ν | n |
|---|---|---|---|---|
| 1 | −453.573 | 1.90 | 23.8 | 1.84666 |
| 2 | 169.447 | 2.82 | | |
| 3 | 174.470 | 9.40 | 95.0 | 1.43875 |
| 4 | −150.519 | 6.94 | | |
| 5 | 94.922 | 8.70 | 82.6 | 1.49782 |
| 6 | −441.788 | 0.10 | | |
| 7 | 58.543 | 7.40 | 52.3 | 1.74810 |
| 8 | 195.841 | d8 | | |
| 9 | 60.562 | 0.90 | 35.8 | 1.90265 |
| 10 | 11.692 | 5.50 | | |
| 11 | −55.558 | 0.90 | 52.3 | 1.74810 |
| 12 | 42.524 | 0.10 | | |
| 13 | 20.282 | 6.20 | 30.8 | 1.61750 |
| 14 | −17.643 | 0.90 | 46.4 | 1.80411 |
| 15 | 41.633 | 2.40 | 23.0 | 1.86074 |
| 16 | 6504.092 | d16 | | |
| 17 | −24.915 | 0.90 | 52.3 | 1.74810 |
| 18 | 54.346 | 2.70 | 23.0 | 1.86074 |
| 19 | −400.129 | d19 | | |
| 20 | −68.073 | 3.60 | 65.8 | 1.46450 |
| 21 | −27.589 | 0.10 | | |
| 22 | 52.986 | 5.40 | 70.2 | 1.48749 |
| 23 | −88.727 | 0.10 | | |
| 24 | 65.278 | 7.10 | 56.5 | 1.50137 |
| 25 | −39.536 | 1.20 | 39.8 | 1.86994 |
| 26 | −175.382 | 36.30 | | |
| 27 | 45.758 | 6.00 | 65.8 | 1.46450 |
| 28 | −56.878 | 0.70 | | |
| 29 | −71.071 | 1.00 | 39.8 | 1.86994 |
| 30 | 32.743 | 7.30 | 70.2 | 1.48749 |
| 31 | −42.526 | 0.10 | | |
| 32 | 157.576 | 5.40 | 49.1 | 1.53172 |
| 33 | −29.546 | 1.00 | 39.8 | 1.86994 |
| 34 | −130.985 | 0.10 | | |
| 35 | 29.193 | 4.40 | 70.2 | 1.48749 |
| 36 | 396.494 | 10.00 | | |
| 37 | 0.000 | 30.00 | 38.1 | 1.60342 |
| 38 | 0.000 | 16.20 | 64.1 | 1.51680 |
| 39 | 0.000 | 2.02 | | |

(Variable clearance in varying the focal length)

| f | 8.75 | 40 | 127 |
|---|---|---|---|
| d8 | 0.8543 | 34.4666 | 45.6605 |
| d16 | 47.8103 | 9.2889 | 3.7487 |
| d19 | 5.0260 | 9.9351 | 4.2814 |

TABLE 9-continued (Aspherical coefficient)
Second Surface:

$k = 0.0000$
$A = 1.6949 \times 10^{-7}$
$B = -7.4565 \times 10^{-12}$
$C = 8.9183 \times 10^{-15}$
$D = 0.0000$
$| xa_1(h_1) - x_1(h_1) | = 0.265$ mm $(h_1 = 35.15$ mm$)$ Eleventh Surface:

$k = 0.0000$
$A = 8.0949 \times 10^{-6}$
$B = -4.4929 \times 10^{-8}$
$C = 4.6469 \times 10^{-10}$
$D = 0.0000$
$| xa_2(h_2) - x_2(h_2) | = 0.055$ mm $(h_2 = 9.2$ mm$)$ (Values corresponding to the conditions)

(5) $7.539 \times 10^{-3}$
(6) $5.978 \times 10^{-3}$
(7) $-0.456$
(8) $0.765$
(9) $1.034$

[Tenth Embodiment]

Figure 10:
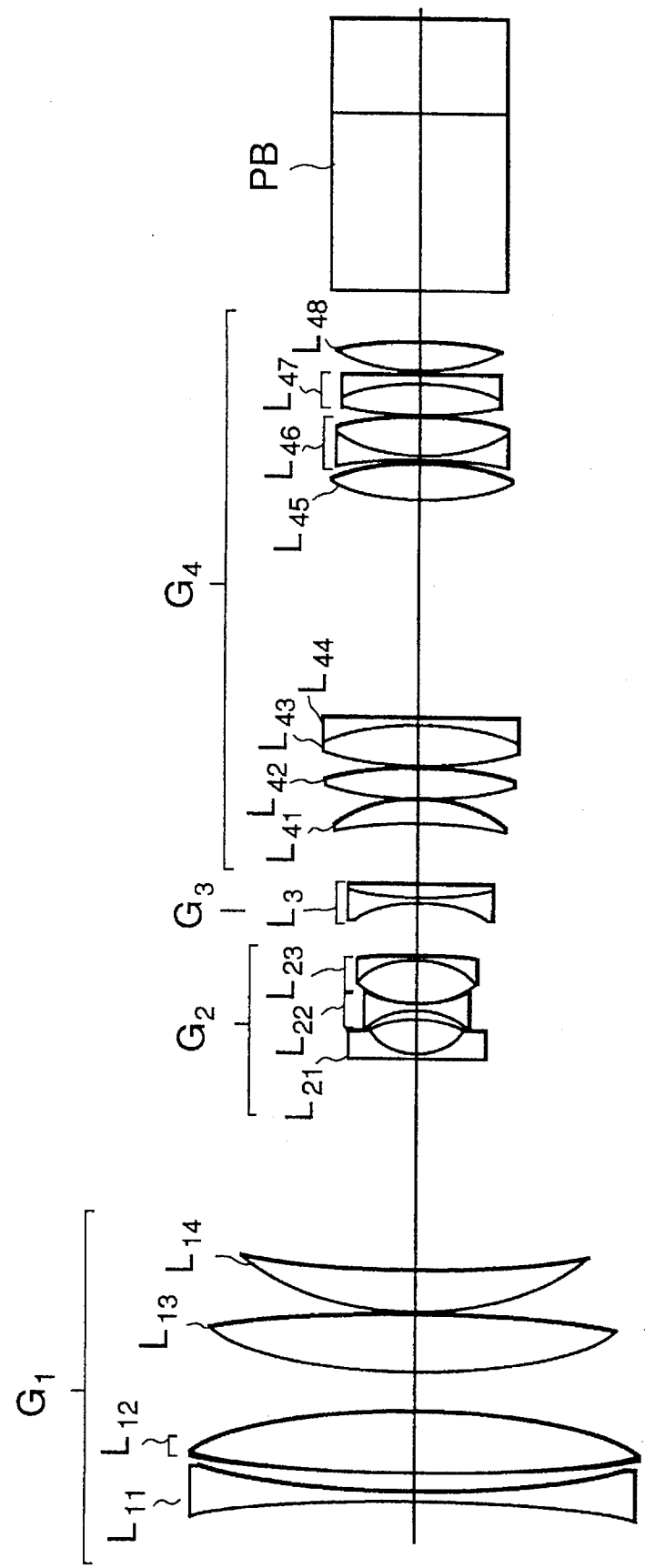
FIG. 10 is a lens construction view of a tenth embodiment according to the present invention.

A tenth embodiment according to the present invention is described, referring to FIG. 10. FIG. 10 is a lens construction diagram of the tenth embodiment.

The constructions of the first and second lens groups $G_1$ and $G_2$ of the tenth embodiment differ from that of the ninth embodiment. In this embodiment, the constructions of the first and second lens groups $G_1$ and $G_2$ are described to simplify the description.

In FIG. 10, the first lens group $G_1$ has a biconcave negative lens $L_{11}$, a biconvex positive lens $L_{12}$, a biconvex positive lens $L_{13}$ with a lens surface of a more intense curvature faced to the object side, and a meniscus-shaped positive lens $L_{14}$ the convex surface of which is faced to the object side in this order from the object side. In this case, the lens surface facing to the object side of the biconvex positive lens $L_{12}$ is provided with an aspherical surface layer the object-side surface of which is formed an aspherical shape.

The second lens group $G_2$ has a meniscus-shaped negative lens $L_{21}$ the convex surface of which is faced to the object side, a meniscus-shaped positive lens $L_{22}$ the concave surface of which is faced to the object side, a biconcave negative lens $L_{22}$, and a cemented lens $L_{23}$ which comprises a biconvex positive lens and a meniscus-shaped negative lens the concave surface of which is faced to the object side, in this order from the object side. In this case, the lens surface facing to the image side of the cemented lens $L_{22}$ is provided with an aspherical surface layer the object-side surface of which is formed an aspherical shape.

The values of specifications according to this embodiment are shown in Table 10. In the specifications table for this embodiment, f denotes a focal length and F denotes the F number. Numerals in the extreme left denote the order numbers of lenses from the object side, r is a radius of curvature of a lens surface, d is a clearance between lens surfaces, and n and ν are respectively the values in reference to the refractive index and the Abbe's number for the D line ($\lambda=587.6$ nm). Since the aberrations of the zoom lens system according to the present invention are corrected including the prism block PB showing the plane parallel plate which includes the color separating prism and filters also in the zoom lens system according to the present invention, the specifications for these components are simultaneously shown. The aspherical profile is expressed by the above equation (11).

TABLE 10

$f = 8.75-127$
$F = 1.72-2.13$

| | r | d | ν | n |
|---|---|---|---|---|
| 1 | −322.513 | 1.90 | 25.4 | 1.80518 |
| 2 | 176.425 | 2.13 | | |
| 3 | 205.888 | 0.03 | 56.3 | 1.49521 |
| 4 | 205.888 | 9.70 | 95.0 | 1.43875 |
| 5 | −126.136 | 6.74 | | |
| 6 | 91.305 | 8.25 | 67.9 | 1.59319 |
| 7 | −660.378 | 0.10 | | |
| 8 | 53.727 | 8.10 | 67.9 | 1.59319 |
| 9 | 191.954 | d9 | | |
| 10 | 73.337 | 0.80 | 35.8 | 1.90265 |
| 11 | 12.235 | 5.50 | | |
| 12 | −37.648 | 1.80 | 23.0 | 1.86074 |
| 13 | −22.320 | 0.80 | 52.3 | 1.74810 |
| 14 | 35.012 | 0.30 | 56.3 | 1.49521 |
| 15 | 35.012 | 0.10 | | |
| 16 | 24.512 | 6.80 | 30.8 | 1.61750 |
| 17 | −12.853 | 0.80 | 46.4 | 1.80411 |
| 18 | −53.955 | d18 | | |
| 19 | −24.527 | 0.90 | 49.4 | 1.77279 |
| 20 | 55.283 | 2.65 | 23.0 | 1.86074 |
| 21 | −214.676 | d21 | | |
| 22 | −67.745 | 3.45 | 65.8 | 1.46450 |
| 23 | −27.963 | 0.10 | | |
| 24 | 51.651 | 5.20 | 65.8 | 1.46450 |
| 25 | −81.356 | 0.10 | | |
| 26 | 64.792 | 7.10 | 65.8 | 1.46450 |
| 27 | −38.604 | 1.20 | 39.8 | 1.86994 |
| 28 | −126.586 | 36.26 | | |
| 29 | 40.874 | 6.00 | 65.8 | 1.46450 |
| 30 | −56.383 | 0.70 | | |
| 31 | −71.332 | 1.00 | 39.8 | 1.86994 |
| 32 | 31.810 | 7.60 | 65.8 | 1.46450 |
| 33 | −43.593 | 0.10 | | |
| 34 | 124.299 | 5.40 | 56.5 | 1.50137 |
| 35 | −28.945 | 1.00 | 43.3 | 1.84042 |
| 36 | −119.274 | 0.10 | | |
| 37 | 28.648 | 4.40 | 65.8 | 1.46450 |
| 38 | 457.701 | 10.00 | | |
| 39 | 0.000 | 30.00 | 38.1 | 1.60342 |
| 40 | 0.000 | 16.20 | 64.1 | 1.51680 |
| 41 | 0.000 | 1.52 | | |

(Variable clearance in varying the focal length)

| f | 8.75 | 40 | 127 |
|---|---|---|---|
| d9 | 0.7161 | 34.1772 | 45.2766 |
| d18 | 46.5657 | 8.2694 | 2.8840 |
| d21 | 5.1631 | 9.9982 | 4.2842 |

(Aspherical coefficient)
Third Surface:

$k = 0.0000$
$A = -2.6356 \times 10^{-7}$
$B = 1.8109 \times 10^{-11}$
$C = -1.7028 \times 10^{-14}$
$D = 0.0000$
$| xa_1(h_1) - x_1(h_1) | = 0.418$ mm $(h_1 = 35.35$ mm$)$ Fifteenth Surface:

$k = 0.0000$
$A = -2.6178 \times 10^{-5}$
$B = 5.3831 \times 10^{-8}$
$C = -9.2878 \times 10^{-10}$
$D = 0.0000$
$| xa_2(h_2) - x_2(h_2) | = 0.170$ mm $(h_2 = 8.85$ mm$)$ (Values corresponding to the conditions)

Figure 11:
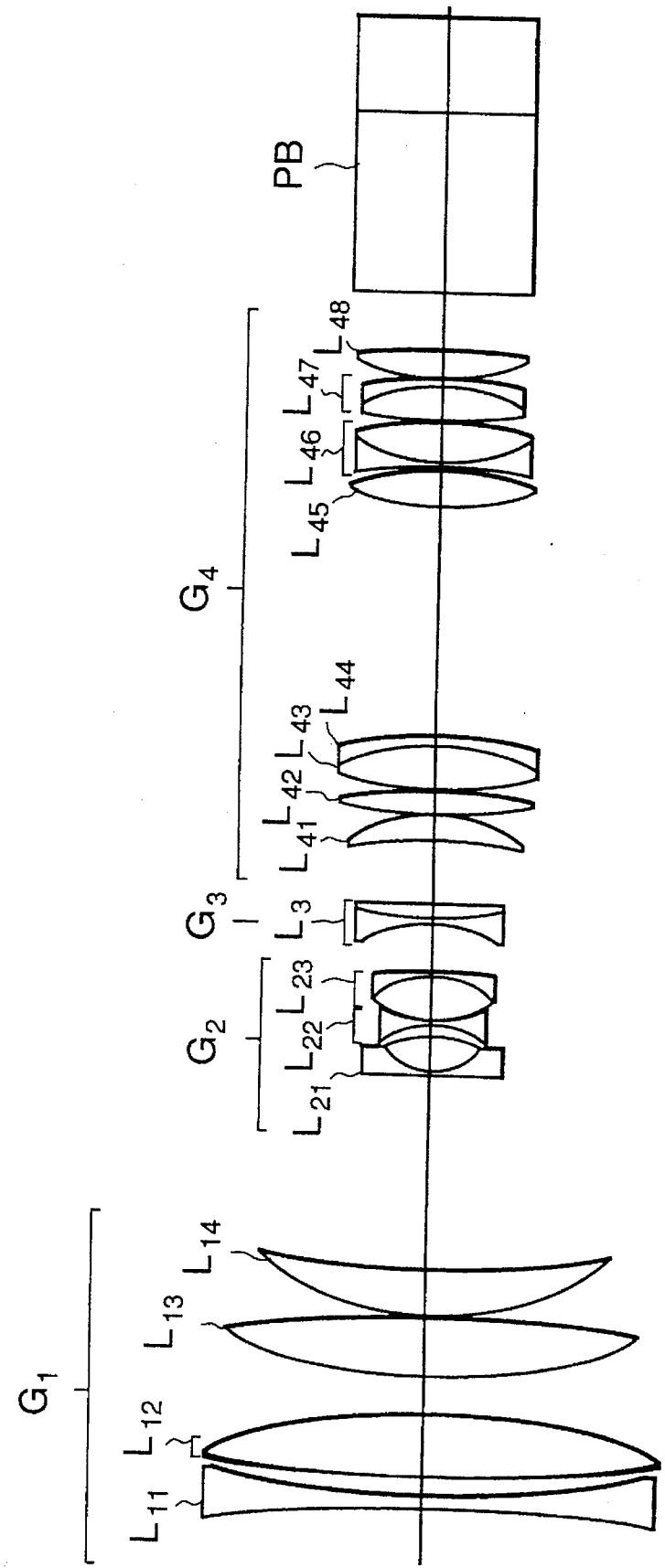
FIG. 11 is a lens construction view of an eleventh embodiment according to the present invention.
Figure 12:
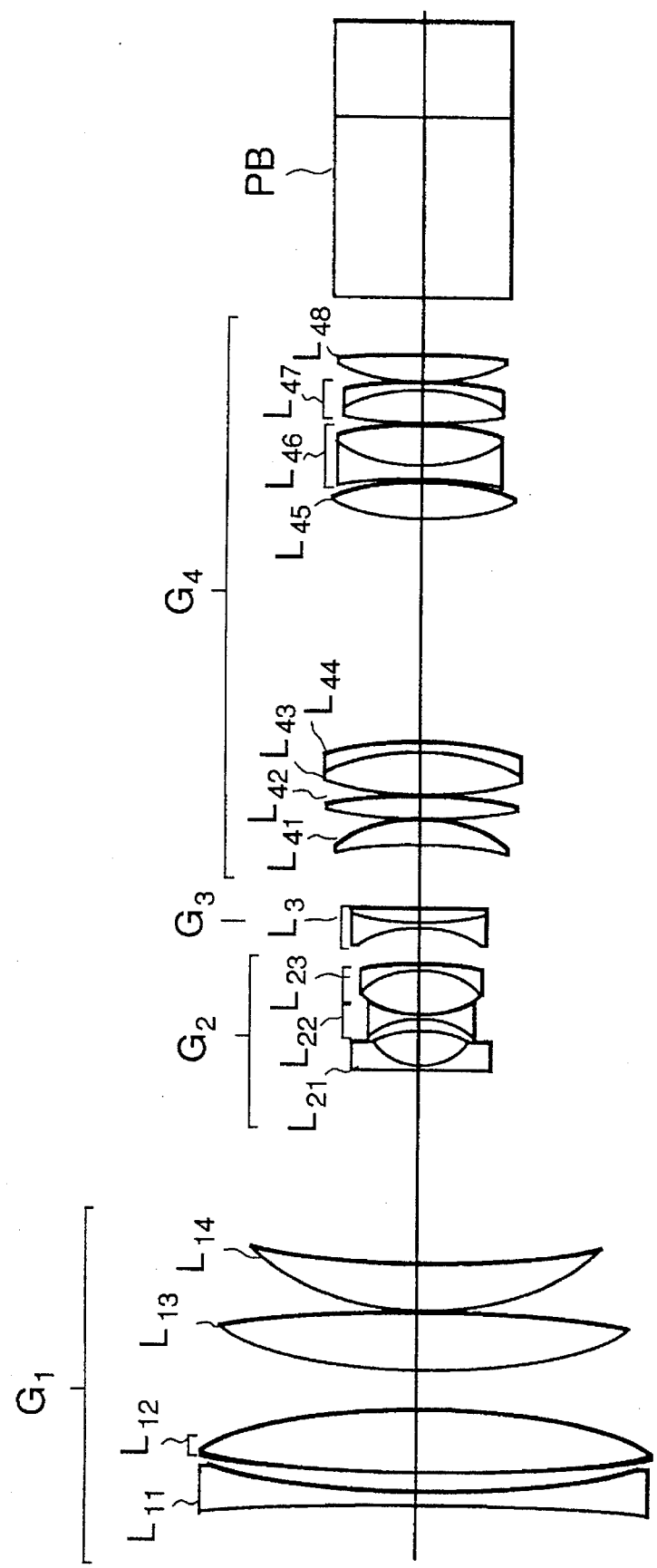
FIG. 12 is a lens construction view of a twelfth embodiment according to the present invention.

(5) $1.182 \times 10^{-2}$
(6) $1.921 \times 10^{-2}$
(7) $-0.293$
(8) $0.764$
(9) $1.040$ Eleventh and twelfth embodiments according to the present invention are described, referring to FIGS. 11 and 12. FIG. 11 is a lens construction diagram of the eleventh embodiment and FIG. 12 is a lens construction diagram of the twelfth embodiment. In the eleventh and twelfth embodiments shown in FIGS. 11 and 12, the construction of the fourth lens group $G_4$ differs from that of the tenth embodiment shown in FIG. 10. In this case, the construction of the fourth lens group $G_4$ is described to simplify the description.

In FIGS. 11 and 12, the fourth lens group $G_4$ has a meniscus-shaped positive lens $L_{41}$ the concave surface of which is faced to the object side, a biconvex positive lens $L_{42}$ with a more intense curvature surface faced to the object side, a cemented lens which comprises a biconvex positive lens $L_{43}$ and a meniscus-shaped negative lens $L_{44}$ the concave surface of which is faced to the object side, a biconvex positive lens $L_{45}$, a cemented lens $L_{46}$ which comprises a biconcave negative lens and a biconvex positive lens, a cemented lens $L_{47}$ which comprises a biconvex positive lens and a meniscus-shaped negative lens the concave surface of which is faced to the object side, and a biconvex positive lens $L_{48}$ with a more intense curvature surface faced to the object side.

[Eleventh Embodiment]

The values of specifications according to the eleventh embodiment are shown in Table 11. In the specifications table for this embodiment, f denotes a focal length and F denotes the F number. Numerals in the extreme left denote the order numbers of lenses from the object side, r is a radius of curvature of a lens surface, d is a clearance between lens surfaces, and n and ν are respectively the values in reference to the refractive index and the Abbe's number for the D line ($\lambda$=587.6 nm). Since the aberrations of the zoom lens system according to the present invention are corrected including the prism block PB showing the plane parallel plate which includes the color separating prism and filters also in the zoom lens system according to the present invention, the specifications for these components are simultaneously shown. The aspherical profile is expressed by the above equation (11).

TABLE 11 f = 8.75–127
F = 1.72–2.24

| | r | d | ν | n |
|---|---|---|---|---|
| 1 | −322.788 | 1.90 | 25.4 | 1.80518 |
| 2 | 59.626 | 1.80 | | |
| 3 | 42.178 | 0.03 | 56.3 | 1.49521 |
| 4 | 42.178 | 10.90 | 95.0 | 1.43875 |
| 5 | −145.284 | 7.16 | | |
| 6 | 90.253 | 9.50 | 67.9 | 1.59319 |
| 7 | −276.046 | 0.10 | | |
| 8 | 47.986 | 7.55 | 67.9 | 1.59319 |
| 9 | 143.500 | d9 | | |
| 10 | 127.397 | 0.90 | 35.8 | 1.90265 |
| 11 | 11.766 | 5.20 | | |
| 12 | −54.110 | 2.70 | 23.0 | 1.86074 |
| 13 | −21.171 | 0.90 | 52.3 | 1.74810 |
| 14 | 30.955 | 0.30 | 56.3 | 1.49521 |
| 15 | 30.955 | 0.10 | | |
| 16 | 24.513 | 6.10 | 30.8 | 1.61750 |
| 17 | −15.672 | 1.00 | 43.3 | 1.84042 |
| 18 | −57.371 | d18 | | |
| 19 | −25.480 | 0.90 | 46.4 | 1.80411 |
| 20 | 48.765 | 2.60 | 23.0 | 1.86074 |
| 21 | −191.637 | d21 | | |

TABLE 11-continued

| 22 | −65.937 | 2.95 | 65.8 | 1.46450 |
|---|---|---|---|---|
| 23 | −30.749 | 0.10 | | |
| 24 | 63.117 | 4.10 | 65.8 | 1.46450 |
| 25 | −115.594 | 0.10 | | |
| 26 | 57.813 | 7.10 | 65.8 | 1.46450 |
| 27 | −37.210 | 1.20 | 39.8 | 1.86994 |
| 28 | −83.331 | 36.88 | | |
| 29 | 37.021 | 6.40 | 65.8 | 1.46450 |
| 30 | −55.587 | 0.70 | | |
| 31 | −76.620 | 1.00 | 39.8 | 1.86994 |
| 32 | 28.748 | 6.90 | 65.8 | 1.46450 |
| 33 | −52.949 | 0.10 | | |
| 34 | 154.781 | 5.50 | 56.5 | 1.50137 |
| 35 | −26.926 | 1.00 | 43.3 | 1.84042 |
| 36 | −91.574 | 0.10 | | |
| 37 | 29.882 | 4.60 | 65.8 | 1.46450 |
| 38 | −506.119 | 10.00 | | |
| 39 | 0.000 | 30.00 | 38.1 | 1.60342 |
| 40 | 0.000 | 16.20 | 64.1 | 1.51680 |
| 41 | 0.000 | 1.23 | | |

(Variable clearance in varying the focal length)

| f | 8.75 | 40 | 127 |
|---|---|---|---|
| d9 | 0.7767 | 30.3742 | 39.8224 |
| d18 | 40.1399 | 6.4650 | 4.5761 |
| d21 | 7.2725 | 11.3500 | 3.7906 |

(Aspherical coefficient)
Third Surface:

k = 0.0000
A = −3.9534 × 10$^{-7}$
B = 2.1461 × 10$^{-11}$
C = −1.7069 × 10$^{-14}$
D = 0.0000
| $xa_1(h_1) - x_1(h_1)$ | = 0.606 mm ($h_1$ = 35.2 mm)

Fifteenth Surface:

k = 0.0000
A = −3.8567 × 10$^{-5}$
B = 4.7754 × 10$^{-8}$
C = −1.2011 × 10$^{-9}$
D = 0.0000
| $xa_2(h_2) - x_2(h_2)$ | = 0.240 mm ($h_2$ = 8.7 mm)

(Values corresponding to the conditions)

(5) 1.722 × 10$^{-2}$
(6) 2.759 × 10$^{-2}$
(7) −0.338
(8) 0.703
(9) 1.166

[Twelfth Embodiment]

The values of specifications according to the twelfth embodiment are shown in Table 12. In the specifications table for this embodiment, f denotes a focal length and F denotes the F number. Numerals in the extreme left denote the order numbers of lenses from the object side, r is a radius of curvature of a lens surface, d is a clearance between lens surfaces, and n and ν are respectively the values in reference to the refractive index and the Abbe's number for the D line ($\lambda$=587.6 nm). Since the aberrations of the zoom lens system according to the present invention are corrected including the prism block PB showing the plane parallel plate which includes the color separating prism and filters also in the zoom lens system according to the present invention, the specifications for these components are simultaneously shown. The aspherical profile is expressed by the above equation (11).

TABLE 12 f = 8.75–127
F = 1.71–2.23

| | r | d | v | n |
|---|---|---|---|---|
| 1 | −1111.646 | 1.90 | 25.4 | 1.80518 |
| 2 | 119.020 | 2.42 | | |
| 3 | 134.554 | 0.03 | 56.3 | 1.49521 |
| 4 | 134.554 | 10.75 | 95.0 | 1.43875 |
| 5 | −157.481 | 7.22 | | |
| 6 | 83.616 | 9.15 | 67.9 | 1.59319 |
| 7 | −385.091 | 0.10 | | |
| 8 | 47.394 | 7.80 | 67.9 | 1.59319 |
| 9 | 140.151 | d9 | | |
| 10 | 148.933 | 0.90 | 35.8 | 1.90265 |
| 11 | 12.126 | 5.30 | | |
| 12 | −39.495 | 2.20 | 23.0 | 1.86074 |
| 13 | −21.065 | 0.90 | 52.3 | 1.74810 |
| 14 | 33.561 | 0.30 | 56.3 | 1.49521 |
| 15 | 33.561 | 0.10 | | |
| 16 | 27.150 | 6.90 | 30.8 | 1.61750 |
| 17 | −12.176 | 1.00 | 43.3 | 1.84042 |
| 18 | −37.524 | d18 | | |
| 19 | −25.695 | 0.90 | 46.4 | 1.80411 |
| 20 | 46.681 | 2.45 | 23.0 | 1.86074 |
| 21 | −204.905 | d21 | | |
| 22 | −65.560 | 2.70 | 65.8 | 1.46450 |
| 23 | −30.840 | 0.10 | | |
| 24 | 63.507 | 3.85 | 65.8 | 1.46450 |
| 25 | −117.968 | 0.10 | | |
| 26 | 57.777 | 7.25 | 65.8 | 1.46450 |
| 27 | −36.073 | 1.70 | 39.8 | 1.86994 |
| 28 | −78.383 | 35.91 | | |
| 29 | 36.172 | 6.40 | 65.8 | 1.46450 |
| 30 | −55.826 | 0.70 | | |
| 31 | −78.182 | 1.50 | 39.8 | 1.86994 |
| 32 | 27.506 | 7.00 | 65.8 | 1.46450 |
| 33 | −52.824 | 0.10 | | |
| 34 | 204.671 | 5.40 | 56.5 | 1.50137 |
| 35 | −26.524 | 1.50 | 43.3 | 1.84042 |
| 36 | −84.293 | 0.10 | | |
| 37 | 29.647 | 4.60 | 65.8 | 1.46450 |
| 38 | −441.751 | 10.00 | | |
| 39 | 0.000 | 30.00 | 38.1 | 1.60342 |
| 40 | 0.000 | 16.20 | 64.1 | 1.51680 |
| 41 | 0.000 | 1.31 | | |

(Variable clearance in varying the focal length)

| f | 8.75 | 40 | 127 |
|---|---|---|---|
| d9 | 0.6445 | 30.2432 | 39.6913 |
| d18 | 39.1961 | 5.5197 | 3.6309 |
| d21 | 7.4568 | 11.5344 | 3.9752 |

(Aspherical coefficient)
Third Surface:

$k = 0.0000$
$A = -2.6356 \times 10^{-7}$
$B = 1.8109 \times 10^{-11}$
$C = -1.7028 \times 10^{-14}$
$D = 0.0000$
$| xa_1(h_1) - x_1(h_1) | = 0.403$ mm ($h_1 = 35.05$ mm)

Fifteenth Surface:

$k = 0.0000$
$A = -4.5754 \times 10^{-5}$
$B = 3.8469 \times 10^{-8}$
$C = -1.5146 \times 10^{-9}$
$D = 0.0000$
$| xa_2(h_2) - x_2(h_2) | = 0.273$ mm ($h_2 = 8.55$ mm)

(Values corresponding to the conditions)

(5) $1.150 \times 10^{-2}$
(6) $3.193 \times 10^{-2}$
(7) −0.807
(8) 0.701
(9) 1.166

[Thirteenth Embodiment]

Figure 13:
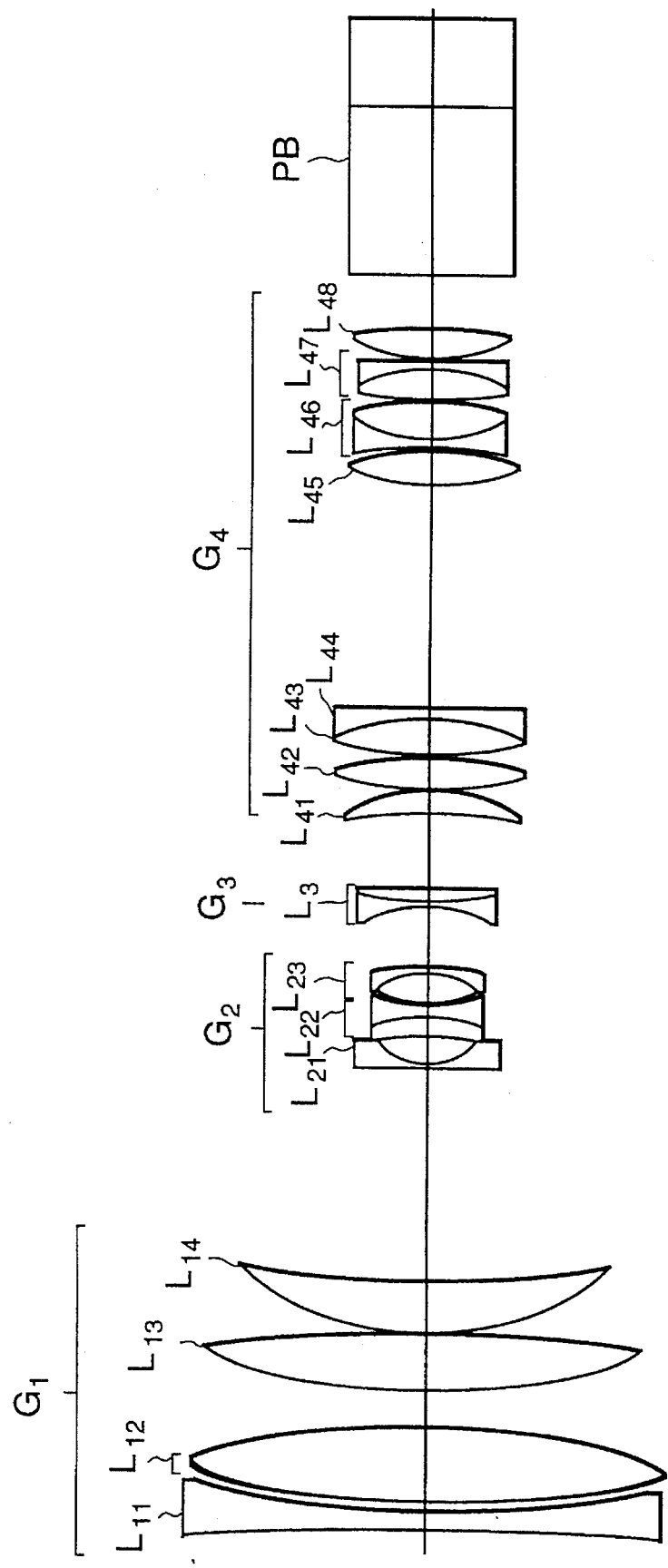
FIG. 13 is a lens construction view of a thirteenth embodiment according to the present invention.

A thirteenth embodiment according to the present invention is described, referring to FIG. 13, FIG. 13 is a lens construction diagram of the thirteenth embodiment.

In the thirteenth embodiment shown in FIG. 13, the construction of the fourth lens group $G_4$ differs from that of the tenth embodiment shown in FIG. 10. In this case, the construction of the fourth lens group $G_4$ is described to simplify the description.

In FIG. 13, the fourth lens group $G_4$ has a meniscus-shaped positive lens $L_{41}$ the concave surface of which is faced to the object side, a biconvex positive lens $L_{42}$ with a more intense curvature surface faced to the object side, a cemented lens which comprises a biconvex positive lens $L_{43}$ and a biconcave negative lens $L_{44}$ with a more intense curvature surface faced to the object side, a biconvex positive lens $L_{45}$, a cemented lens $L_{46}$ which comprises a biconcave negative lens and a biconvex positive lens, a cemented lens $L_{47}$ which comprises a biconvex positive lens and a meniscus-shaped negative lens the concave surface of which is faced to the object side, and a biconvex positive lens $L_{48}$.

The values of specifications according to this embodiment are shown in Table 13. In the specifications table for this embodiment, f denotes a focal length and F denotes the F number. Numerals in the extreme left denote the order numbers of lenses from the object side, r is a radius of curvature of a lens surface, d is a clearance between lens surfaces, and n and v are respectively the values in reference to the refractive index and the Abbe's number for the D line ($\lambda$=587.6 nm). Since the aberrations of the zoom lens system according to the present invention are corrected including the prism block PB showing the plane parallel plate which includes the color separating prism and filters also in the zoom lens system according to the present invention, the specifications for these components are simultaneously shown. The aspherical profile is expressed by the above equation (11).

TABLE 13 f = 8.27–159.5
F = 1.82–2.47

| | r | d | v | n |
|---|---|---|---|---|
| 1 | −338.098 | 1.90 | 25.4 | 1.80518 |
| 2 | 176.389 | 2.35 | | |
| 3 | 149.303 | 0.11 | 56.3 | 1.49521 |
| 4 | 149.303 | 12.50 | 95.0 | 1.43875 |
| 5 | −168.564 | 7.12 | | |
| 6 | 106.006 | 10.50 | 67.9 | 1.59319 |
| 7 | −334.501 | 0.09 | | |
| 8 | 57.807 | 8.90 | 67.9 | 1.59319 |
| 9 | 212.218 | d9 | | |
| 10 | 84.275 | 0.81 | 35.8 | 1.90265 |
| 11 | 12.677 | 5.20 | | |
| 12 | −83.378 | 4.80 | 23.0 | 1.86074 |
| 13 | −15.865 | 0.81 | 46.4 | 1.80411 |
| 14 | 29.559 | 0.18 | 56.3 | 1.49521 |
| 15 | 29.559 | 0.10 | | |
| 16 | 21.070 | 5.50 | 30.8 | 1.61750 |
| 17 | −17.717 | 0.81 | 39.8 | 1.86994 |
| 18 | −365.556 | d18 | | |
| 19 | −27.543 | 0.81 | 43.3 | 1.84042 |
| 20 | 51.000 | 3.20 | 23.0 | 1.86074 |
| 21 | −138.389 | d21 | | |
| 22 | −105.322 | 4.70 | 64.1 | 1.51680 |
| 23 | −30.168 | 0.10 | | |
| 24 | 54.182 | 5.20 | 70.1 | 1.51860 |
| 25 | −115.102 | 0.10 | | |
| 26 | 50.239 | 6.70 | 65.8 | 1.46450 |
| 27 | −54.000 | 2.00 | 39.8 | 1.86994 |
| 28 | 561.007 | 38.25 | | |

TABLE 13-continued

| | | | | |
|---|---|---|---|---|
| 29 | 41.485 | 6.10 | 65.8 | 1.46450 |
| 30 | −45.254 | 0.70 | | |
| 31 | −55.060 | 1.50 | 39.8 | 1.86994 |
| 32 | 27.738 | 7.00 | 64.1 | 1.51680 |
| 33 | −57.220 | 0.10 | | |
| 34 | 78.228 | 6.10 | 40.8 | 1.58144 |
| 35 | −27.233 | 1.50 | 39.8 | 1.86994 |
| 36 | −4389.240 | 0.10 | | |
| 37 | 35.109 | 5.50 | 65.8 | 1.46450 |
| 38 | −68.189 | 10.00 | | |
| 39 | 0.000 | 30.00 | 38.1 | 1.60342 |
| 40 | 0.000 | 16.20 | 64.1 | 1.51680 |
| 41 | 0.000 | 1.27 | | |

(Variable clearance in varying the focal length)

| | | | |
|---|---|---|---|
| f | 8.27 | 40 | 159.5 |
| d9 | 0.6829 | 35.8419 | 48.1000 |
| d18 | 51.8105 | 10.0885 | 5.1527 |
| d21 | 5.7830 | 12.3460 | 5.0236 |

(Aspherical coefficient)
Third Surface:

$k = -3.9187$
$A = -1.6634 \times 10^{-7}$
$B = 2.3628 \times 10^{-11}$
$C = -2.7906 \times 10^{-14}$
$D = 8.0568 \times 10^{-18}$
$| xa_1(h_1) - x_1(h_1) | = 0.813$ mm ($h_1 = 40.4$ mm)

Fifteenth Surface:

$k = 0.0000$
$A = -1.2873 \times 10^{-5}$
$B = 0.0000$
$C = 0.0000$
$D = 0.0000$
$| xa_2(h_2) - x_2(h_2) | = 0.079$ mm ($h_2 = 8.85$ mm)

(Values corresponding to the conditions)

(5) $2.012 \times 10^{-2}$
(6) $8.927 \times 10^{-3}$
(7) −0.314
(8) 0.679
(9) 1.029

[Fourteenth Embodiment]

Figure 14:
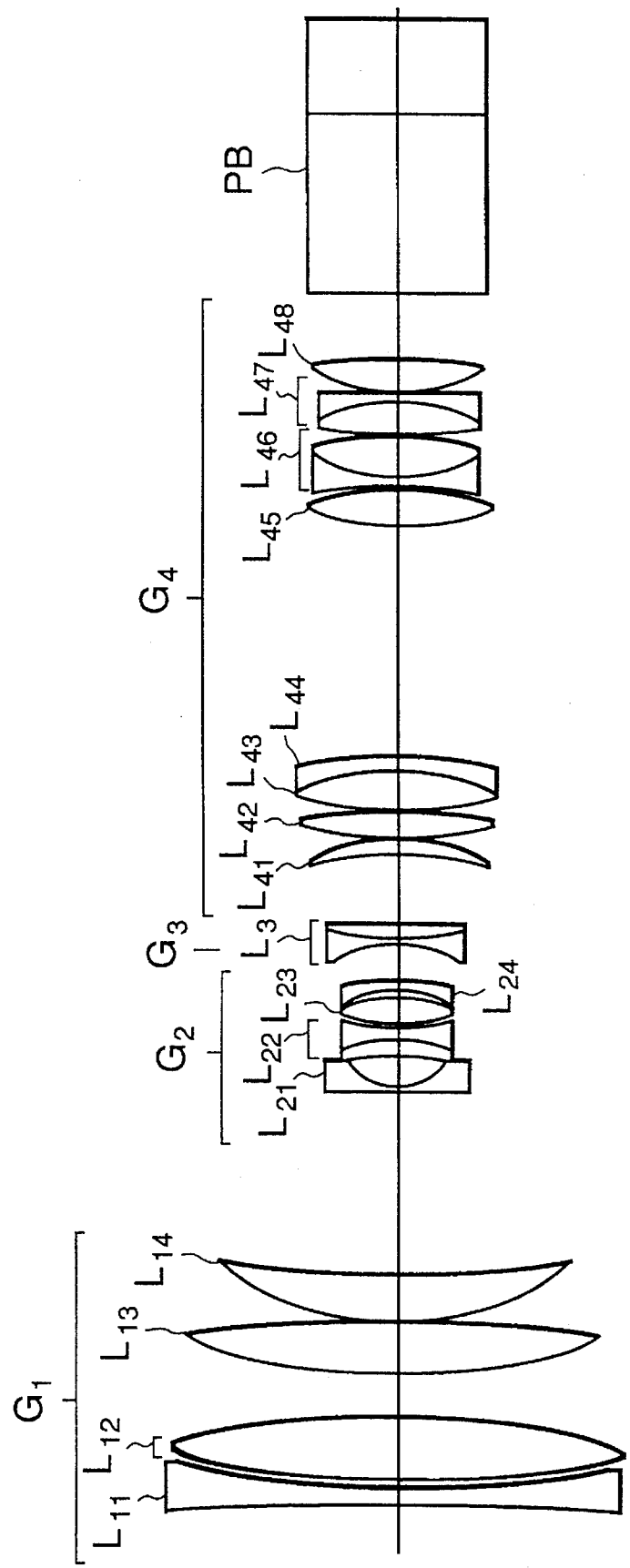
FIG. 14 is a lens construction view of a fourteenth embodiment according to the present invention.
Figure 15:
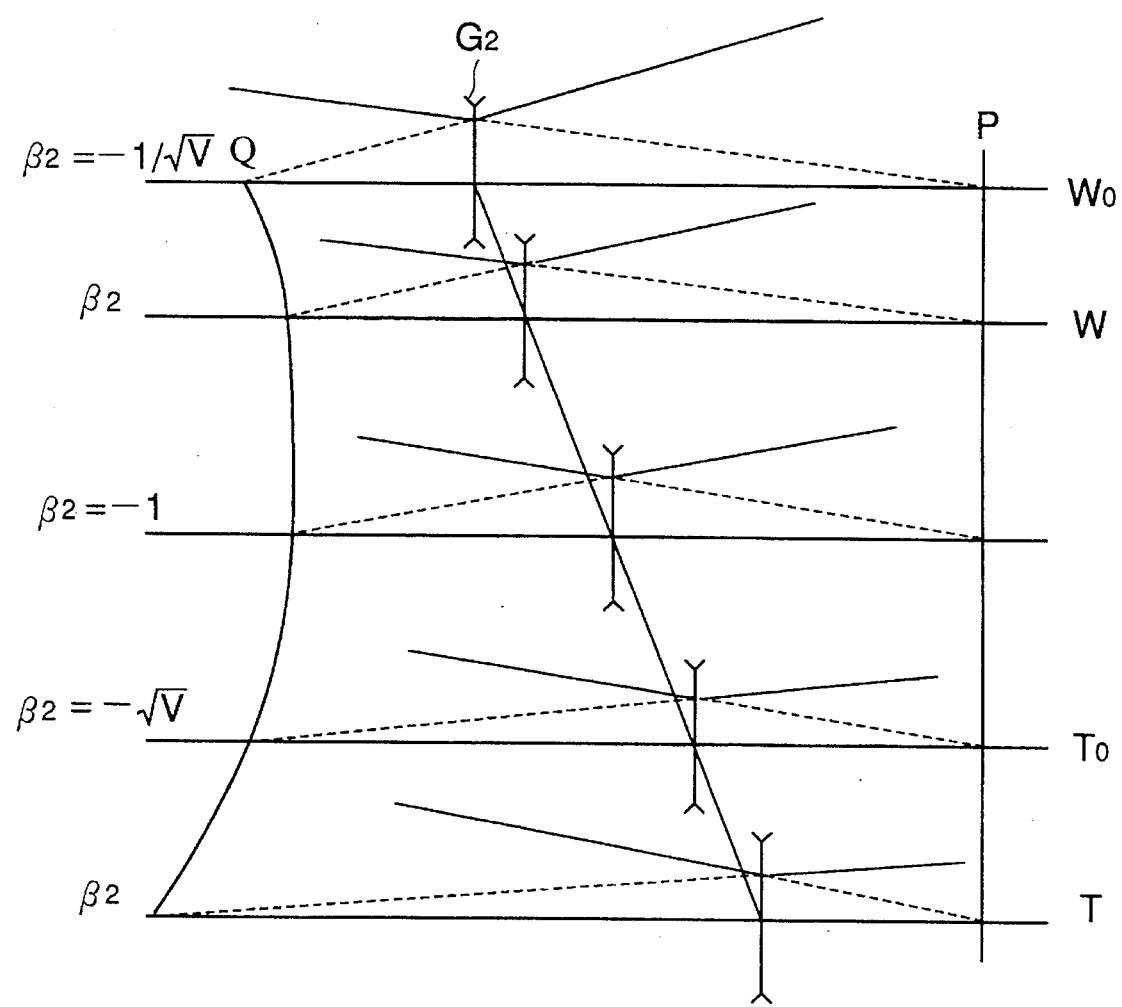
FIG. 15 is an illustration showing the operation of the second lens group in the zoom lens system according to the present invention.

A fourteenth embodiment according to the present invention is described, referring to FIG. 14. FIG. 14 is a lens construction diagram of the fourteenth embodiment.

The constructions of the second lens group $G_2$ and the fourth lens group $G_4$ of the fourteenth embodiment differ from that of the tenth embodiment shown in FIG. 10. In this embodiment, the constructions of the second lens groups $G_2$ and the fourth lens group $G_4$ are described to simplify the description.

In FIG. 14, the second lens group $G_2$ has a meniscus-shaped negative lens $L_{21}$ the convex surface of which is faced to the object side, a cemented lens $L_{22}$ which comprises a meniscus-shaped positive lens the concave surface of which is faced to the object side and a biconcave negative lens, and a biconvex positive lens $L_{23}$ with a more intense curvature surface faced to the image side, and a meniscus-shaped negative lens the concave surface of which is faced to the object side, in this order from the object side.

The fourth lens group $G_4$ has a meniscus-shaped positive lens $L_{41}$ the concave surface of which is faced to the object side, a biconvex positive lens $L_{42}$, a cemented lens which comprises a biconvex positive lens $L_{43}$ and a meniscus-shaped negative lens $L_{44}$ the concave surface of which is faced to the object side, a biconvex positive lens $L_{45}$, a cemented lens $L_{46}$ which comprises a biconcave negative lens with a more intense curvature surface faced to the image side and a biconvex positive lens, a cemented lens $L_{47}$ which comprises a biconvex positive lens with a more intense curvature surface faced to the image side and a meniscus-shaped negative lens the concave surface of which is faced to the object side, and a biconvex positive lens $L_{48}$ with a more intense curvature surface faced to the object side.

The values of specifications according to this embodiment are shown in Table 14. In the specifications table for this embodiment, f denotes a focal length and F denotes the F number. Numerals in the extreme left denote the order numbers of lenses from the object side, r is a radius of curvature of a lens surface, d is a clearance between lens surfaces, and n and ν are respectively the values in reference to the refractive index and the Abbe's number for the D line ($\lambda=587.6$ nm). Since the aberrations of the zoom lens system according to the present invention are corrected including the prism block PB showing the plane parallel plate which includes the color separating prism and filters also in the zoom lens system according to the present invention, the specifications for these components are simultaneously shown. The aspherical profile is expressed by the above equation (11).

TABLE 14

$f = 8.75–127$
$F = 1.71–2.24$

| | r | d | ν | n |
|---|---|---|---|---|
| 1 | −978.501 | 1.90 | 25.4 | 1.80518 |
| 2 | 118.936 | 2.30 | | |
| 3 | 133.153 | 0.10 | 56.3 | 1.49521 |
| 4 | 142.776 | 10.75 | 95.0 | 1.43875 |
| 5 | −155.227 | 7.12 | | |
| 6 | 85.648 | 9.20 | 67.9 | 1.59319 |
| 7 | −398.420 | 0.10 | | |
| 8 | 47.447 | 7.75 | 67.9 | 1.59319 |
| 9 | 149.649 | d9 | | |
| 10 | 169.263 | 0.90 | 35.8 | 1.90265 |
| 11 | 12.563 | 5.30 | | |
| 12 | −30.363 | 2.75 | 23.0 | 1.86074 |
| 13 | −15.603 | 0.90 | 52.3 | 1.74810 |
| 14 | 50.801 | 0.14 | 56.3 | 1.49521 |
| 15 | 37.232 | 0.10 | | |
| 16 | 32.336 | 5.60 | 30.8 | 1.61750 |
| 17 | −18.364 | 1.10 | | |
| 18 | −14.718 | 1.00 | 43.3 | 1.84042 |
| 19 | −28.462 | d19 | | |
| 20 | −25.695 | 0.90 | 46.4 | 1.80411 |
| 21 | 46.681 | 2.45 | 23.0 | 1.86074 |
| 22 | −204.906 | d22 | | |
| 23 | −65.560 | 2.70 | 65.8 | 1.46450 |
| 24 | −30.840 | 0.10 | | |
| 25 | 63.507 | 3.85 | 65.8 | 1.46450 |
| 26 | −117.968 | 0.10 | | |
| 27 | 57.777 | 7.25 | 65.8 | 1.46450 |
| 28 | −36.073 | 1.70 | 39.8 | 1.86994 |
| 29 | −78.383 | 35.91 | | |
| 30 | 36.172 | 6.40 | 65.8 | 1.46450 |
| 31 | −55.826 | 0.70 | | |
| 32 | −78.182 | 1.50 | 39.8 | 1.86994 |
| 33 | 27.506 | 7.00 | 65.8 | 1.46450 |
| 34 | −52.824 | 0.10 | | |
| 35 | 204.671 | 5.40 | 56.5 | 1.50137 |
| 36 | −26.524 | 1.50 | 43.3 | 1.84042 |
| 37 | −84.293 | 0.10 | | |
| 38 | 29.647 | 4.60 | 65.8 | 1.46450 |
| 39 | −441.751 | 10.00 | | |
| 40 | 0.000 | 30.00 | 38.1 | 1.60342 |
| 41 | 0.000 | 16.20 | 64.1 | 1.51680 |
| 42 | 0.000 | 1.32 | | |

(Variable clearance in varying the focal length)

| | | | |
|---|---|---|---|
| f | 8.75 | 40 | 127 |
| d9 | 0.6404 | 30.2392 | 39.6871 |

TABLE 14-continued

| | | | |
|---|---|---|---|
| d19 | 39.2006 | 5.5242 | 3.6354 |
| d22 | 7.4568 | 11.5344 | 3.9752 |

(Aspherical coefficient)
Third Surface:

$k = 0.0000$
$A = -2.6356 \times 10^{-7}$
$B = 1.8109 \times 10^{-11}$
$C = -1.7028 \times 10^{-14}$
$D = 0.0000$
$| xa_1(h_1) - x_1(h_1) | = 0.403$ mm ($h_1 = 35.05$ mm)

Fifteenth Surface:

$k = 0.0000$
$A = -4.7228 \times 10^{-5}$
$B = 4.1317 \times 10^{-8}$
$C = -1.6405 \times 10^{-9}$
$D = 0.0000$
$| xa_2(h_2) - x_2(h_2) | = 0.340$ mm ($h_2 = 8.9$ mm)

(Values corresponding to the conditions)

(5) $1.150 \times 10^{-2}$
(6) $3.820 \times 10^{-2}$
(7) $-0.783$
(8) $0.703$
(9) $1.166$ The embodiments described above enable to implement a small-sized, high performance zoom lens system which provides a large zooming ratio and a high clarity.

What is claimed is:

1. A zoom lens system comprising a plurality of lens groups as shown below in an order from an object side:

a first lens group with a positive refractive power;

a second lens group with a negative refractive power;

a third lens group with a negative refractive power;

and a fourth lens group with a positive refractive power, wherein, for varying a focal length from a wide-end to a telephoto-end, said second lens group is moved from an object side to an image side along an optical axis and said third lens group is moved to reciprocate on said optical axis, said second lens group having an aspherical lens surface, and said aspherical lens surface is formed in a shape where the positive refractive power gradually increases or in a shape where the negative refractive power gradually decreases from said optical axis toward a periphery, and satisfies the following condition:

$10^{-3} < |xa(h)-x(h)|/h < 10^{-1}$ where,
 h: a maximum effective radius of said aspherical lens surface,
 xa(h): a value of x at said maximum effective radius h as expressed on the coordinate system in which a vertex of said aspherical lens surface is set at the origin, an x axis is set as the optical axis and a y axis is set as a line which passes through the origin and orthogonally intersects said x axis,
 x(h): a value of x of a paraxial curvature radius of said aspherical lens surface at said maximum effective radius h as expressed on said coordinate system.

2. A zoom lens system according to claim 1, wherein said negative lens component of said first lens group satisfies the following condition:

$-2.0 < (R_2+R_1)/(R_2-R_1) < -1.5$ where,
 $R_1$: a radius of paraxial curvature of the lens surface of a lens nearest to the object side of said negative refractive lens group;
 $R_2$: a radius of paraxial curvature of the lens surface of a lens nearest to an image side of said negative refractive lens group.

3. A zoom lens system according to claim 1, wherein the following condition is satisfied:

$0.6 < F_T^{1/2} \cdot f_1/f_T < 0.9$ where,
 $f_T$: a resultant focal length of the whole system at the telephoto-end
 $F_T$: an F number at the telephoto-end
 $f_1$: a focal length of said first lens group.

4. A zoom lens system according to claim 1, wherein the following condition is satisfied:

$0.9 < |\beta_{2W} \cdot V^{1/2}| < 1.3$ where,
 $\beta_{2W}$: a magnification at the wide-end of said second lens group
 V: a zooming ratio.

5. A zoom lens system according to claim 1, wherein said third lens group has a cemented lens component which comprises a biconcave negative refractive lens component and a biconvex positive refractive lens component.

6. A zoom lens system according to claim 1, wherein said fourth lens group has the following lens groups in an order from the object side:

a front lens group which has a meniscus-shaped positive refractive lens component the convex surface of which is faced to the object side, a biconvex positive refractive lens component, and a negative lens component to be cemented with said positive refractive lens component in an arrangement where a lens surface with a more intense curvature of said negative lens component is faced to said biconvex positive refractive lens component and the object side in this order from the object side; and a rear lens group which a biconvex positive refractive lens component, two cemented lens components, and a positive refractive lens component with a lens surface having a more intense curvature faced to the object side in this order from the object side.

7. A zoom lens system comprising a plurality of lens groups as shown below in an order from an object side:

a first lens group with a positive refractive power;

a second lens group with a negative refractive power;

a third lens group with a negative refractive power; and a fourth lens group with a positive refractive power, wherein, for varying a focal length from a wide-end to a telephoto-end, said second lens group is moved from an object side to an image side along an optical axis and said third lens group is moved to reciprocate on said optical axis, and said first lens group has at least one aspherical lens surface which is formed in a shape where the negative refractive power gradually increases or in a shape where the positive refractive power gradually decreases from said optical axis toward a periphery, said second lens group has at least one aspherical lens surface which is formed in a shape where the positive refractive power gradually increases or in a shape where the negative refractive power gradually decreases from said optical axis toward a periphery, and satisfies the following conditions:

$$10^{-3}<|xa_1(h_1)-x_1(h_1)|/h_1<10^{-1}$$

$$10^{-3}<|xa_2(h_2)-x_2(h_2)|/h_2<10^{-1}$$

where,
- $h_1$: a maximum effective radius of said aspherical lens surface of said first lens group $G_1$,
- $h_2$: a maximum effective radius of said aspherical lens surface of said second lens group $G_2$,
- $xa_1(h_1)$: a value of x at said maximum effective radius $h_1$ as expressed on the coordinate system in which a vertex of said aspherical lens surface of said first lens group $G_1$ is set at the origin, an x axis is set as the optical axis and a y axis is set as a line which passes through the origin and orthogonally intersects said x axis,
- $xa_2(h_2)$: a value of x at said maximum effective radius $h_2$ as expressed on the coordinate system in which a vertex of said aspherical lens surface of said second lens group $G_2$ is set at the origin, an x axis is set as the optical axis and a y axis is set as a line which passes through the origin and orthogonally intersects said x axis,
- $x_1(h_1)$: a value of x of a paraxial curvature radius of said aspherical lens surface at said maximum effective radius $h_1$ as expressed on the coordinate system in which a vertex of said aspherical lens surface of said first lens group $G_1$ is set at the origin, an x axis is set as the optical axis and a y axis is set as a line which passes through the origin and orthogonally intersects said x axis,
- $xa_2(h_2)$: a value of x a paraxial curvature radius of said aspherical lens surface at said maximum effective radius $h_2$ as expressed on the coordinate system in which a vertex of said aspherical lens surface of said second lens group $G_2$ is set at the origin, an x axis is set as the optical axis and a y axis is set as a line which passes through the origin and orthogonally intersects said x axis.

8. A zoom lens system according to claim 7, wherein, of said first lens group, at least one of said negative refractive lens group and said positive refractive lens group, which is located nearest to the object side, has at least one aspherical lens surface.

9. A zoom lens system according to claim 7, wherein said negative lens group of said first lens group satisfies the following condition:

$$1.0<(R_2+R_1)/(R_2-R_1)<-0.1$$

where,
- $R_1$: a radius of paraxial curvature of the lens surface of a lens nearest to the object side of said negative refractive lens group;
- $R_2$: a radius of paraxial curvature of the lens surface of a lens nearest to an image side of said negative refractive lens group.

10. A zoom lens system according to claim 7, wherein the following condition is satisfied:

$$0.6<F_T^{1/2}\cdot f_1/f_T<0.9$$

where,

- $f_T$: a resultant focal length of the whole system at the telephoto-end
- $F_T$: an F number at the telephoto-end
- $f_1$: a focal length of said first lens group $G_1$.

11. A zoom lens system according to claim 7, wherein the following condition is satisfied:

$$0.9<|\beta_{2W}\cdot V^{1/2}|<1.3$$

where,
- $\beta_{2W}$: a magnification at the wide-end of said second lens group $G_2$
- V: a zooming ratio.

12. A zoom lens system according to claim 7, wherein said third lens group has a cemented lens component which comprises a biconcave negative refractive lens component and a biconvex positive refractive lens component.

13. A zoom lens system according to claim 7, wherein said fourth lens group has the following lens groups in an order from the object side:

a front lens group which has a meniscus-shaped positive refractive lens component the convex surface of which is faced to the object side, a biconvex positive refractive lens component, and a negative lens component to be cemented with said positive refractive lens component in an arrangement where a lens surface with a more intense curvature of said negative lens component is faced to said biconvex positive refractive lens component and the object side in this order from the object side; and a rear lens group which a biconvex positive refractive lens component, two cemented lens components, and a positive refractive lens component with a lens surface having a more intense curvature faced to the object side in this order from the object side.

14. A zoom lens system comprising a plurality of lens groups as shown below in an order from an object side:

a first lens group with a positive refractive power;

a second lens group with a negative refractive power;

a third lens group with a negative refractive power; and a fourth lens group with a positive refractive power, wherein, for varying a focal length from a wide-end to a telephoto-end, said second lens group is moved from an object side to an image side along an optical axis and said third lens group is moved to reciprocate on said optical axis, said first lens group having an aspherical lens surface, said aspherical lens surface being formed in a shape where the negative refractive power gradually increases or in a shape where the positive refractive power gradually decreases from said optical axis toward a periphery, and satisfying the following condition:

$$10^{-3}<|xa(h)-x(h)|/h<10^{-1}$$

where,
- h: a maximum effective radius of said aspherical lens surface,
- xa(h): a value of x at said maximum effective radius as expressed on the coordinate system in which a vertex of said aspherical lens surface is set at the origin, an x axis is set as the optical axis and a y axis is set as a line which passes through the origin and orthogonally intersects said x axis,
- x(h): a value of x of a paraxial curvature of said aspherical lens surface at said maximum effective radius as expressed on said coordinate system; and wherein said first lens group has a group of negative refractive lenses and at least three groups of positive refractive lenses in this order from an object side; and said second lens group has at least three groups of lenses.

15. A zoom lens system according to claim 14, wherein, of said first lens group, at least one of said negative refractive lens group and a positive refractive lens group, which is located nearest to the object side, has at least one aspherical lens surface.

16. A zoom lens system according to claim 14, wherein, said negative refractive lens group of said first lens group satisfies a following condition:

$$-0.7<(R_2+R_1)/(R_2-R_1)<0$$

where,
- $R_1$: a radius of paraxial curvature of the lens surface of a lens nearest to the object side of said negative refractive lens group;
- $R_2$: a radius of paraxial curvature of the lens surface of a lens nearest to an image side of said negative refractive lens group.

17. A zoom lens system according to claim 14, wherein the following condition is satisfied:

$$0.6<F_T^{1/2} \cdot f_1/f_T<0.9$$

where,
- $f_T$: a resultant focal length of the whole system at the telephoto-end;
- $F_T$: an F number at the telephoto-end;
- $f_1$: a focal length of said first lens group.

18. A zoom lens system according to claim 14, wherein the following condition is satisfied:

$$0.9<|\beta_{2W} \cdot V^{1/2}|<1.3$$

where,
- $\beta_{2W}$: a magnification at the wide-end of said second lens group;
- $V$: a zooming ratio.

19. A zoom lens system according to claim 14, wherein said third lens group has a cemented lens component which comprises a biconcave negative refractive lens component and a biconvex positive refractive lens component.

20. A zoom lens system according to claim 14, wherein said fourth lens group has the following lens groups in an order from the object side:
- a front lens group which has a meniscus-shaped positive refractive lens component the convex surface of which is faced to the object side, a biconvex positive refractive lens component, and a negative lens component to be cemented with said positive refractive lens component in an arrangement where a lens surface with a more intense curvature of said negative lens component is faced to said biconvex positive refractive lens component and the object side in this order from the object side; and
- a rear lens group which has a biconvex positive refractive lens component, two cemented lens components, and a positive refractive lens component with a lens surface having a more intense curvature faced to the object side in this order from the object side.

21. A zoom lens system comprising a plurality of lens groups as shown below in an order from an object side:
- a first lens group with a positive refractive power;
- a second lens group with a negative refractive power;
- a third lens group with a negative refractive power; and
- a fourth lens group with a positive refractive power,
- wherein for varying a focal length from a wide-end to a telephoto-end, said second lens group is moved from an object side to an image side along an optical axis and said third lens group is moved to reciprocate on said optical axis,
- said first lens group having an aspherical lens surface,
- said aspherical lens surface being formed in a shape where the negative refractive power gradually increases or in a shape where the positive refractive power gradually decreases from said optical axis toward a periphery, and satisfying the following condition:

$$10^{-3}<|xa(h)-x(h)|/h<10^{-1}$$

where,
- h: a maximum effective radius of said aspherical lens surface,
- xa(h): a value of x at said maximum effective radius as expressed on the coordinate system in which a vertex of said aspherical lens surface is set at the origin, an x axis is set as the optical axis and a y axis is set as a line which passes through the origin and orthogonally intersects said x axis,
- x(h): a value of x of a paraxial curvature of said aspherical lens surface at said maximum effective radius as expressed on said coordinate system; and
- wherein said first lens group has a negative refractive lens group and a positive refractive lens group, and, at least one of said negative refractive lens group and said positive refractive lens group, which is located nearest to the object side, has at least one aspherical lens surface.

22. A zoom lens system comprising a plurality of lens groups as shown below in an order from an object side:
- a first lens group with a positive refractive power;
- a second lens group with a negative refractive power;
- a third lens group with a negative refractive power; and
- a fourth lens group with a positive refractive power,
- wherein, for varying a focal length from a wide-end to a telephoto-end, said second lens group is moved from an object side to an image side along an optical axis and said third lens group is moved to reciprocate on said optical axis,
- said first lens group having an aspherical lens surface,
- said aspherical lens surface being formed in a shape where the negative refractive power gradually increases or in a shape where the positive refractive power gradually decreases from said optical axis toward a periphery, and satisfying the following condition:

$$10^{-3}<|xa(h)-x(h)|/h<10^{-1}$$

where,
- h: a maximum effective radius of said aspherical lens surface,
- xa(h): a value of x at said maximum effective radius as expressed on the coordinate system in which a vertex of said aspherical lens surface is set at the origin, an x axis is set as the optical axis and a y axis is set as a line which passes through the origin and orthogonally intersects said x axis, x(h): a value of x of a paraxial curvature of said aspherical lens surface at said maximum effective radius as expressed on said coordinate system; and wherein, said negative refractive lens group of said first lens group satisfies a following condition:

$-0.7<(R_2+R_1)/(R_2-R_1)<0$ where, $R_1$: a radius of paraxial curvature of the lens surface of a lens nearest to the object side of said negative refractive lens group;

$R_2$: a radius of paraxial curvature of the lens surface of a lens nearest to an image side of said negative refractive lens group.

23. A zoom lens system comprising a plurality of lens groups as shown below in an order from an object side:

a first lens group with a positive refractive power;

a second lens group with a negative refractive power;

a third lens group with a negative refractive power; and a fourth lens group with a positive refractive power, wherein, for varying a focal length from a wide-end to a telephoto-end, said second lens group is moved from an object side to an image side along an optical axis and said third lens group is moved to reciprocate on said optical axis, said first lens group having an aspherical lens surface, said aspherical lens surface being formed in a shape where the negative refractive power gradually increases or in a shape where the positive refractive power gradually decreases from said optical axis toward a periphery, and satisfying the following condition:

$10^{-3}<|xa(h)-x(h)|/h<10^{-1}$ where, h : a maximum effective radius of said aspherical lens surface, xa(h): a value of x at said maximum effective radius as expressed on the coordinate system in which a vertex of said aspherical lens surface is set at the origin, an x axis is set as the optical axis and a y axis is set as a line which passes through the origin and orthogonally intersects said x axis, x(h): a value of x of a paraxial curvature of said aspherical lens surface at said maximum effective radius as expressed on said coordinate system; and wherein the following condition is satisfied:

$0.6<F_T^{1/2}\cdot f_1/f_T<0.9$ where, $f_T$: a resultant focal length of the whole system at the telephoto-end;

$F_T$: an F number at the telephoto-end;

$f_1$: a focal length of said first lens group.

24. A zoom lens system comprising a plurality of lens groups as shown below in an order from an object side:

a first lens group with a positive refractive power;

a second lens group with a negative refractive power;

a third lens group with a negative refractive power; and a fourth lens group with a positive refractive power, wherein, for varying a focal length from a wide-end to a telephoto-end, said second lens group is moved from an object side to an image side along an optical axis and said third lens group is moved to reciprocate on said optical axis, said first lens group having an aspherical lens surface, said aspherical lens surface being formed in a shape where the negative refractive power gradually increases or in a shape where the positive refractive power gradually decreases from said optical axis toward a periphery, and satisfying the following condition:

$10^{-3}<|xa(h)-x(h)|/h<10^{-1}$ where, h: a maximum effective radius of said aspherical lens surface, xa(h): a value of x at said maximum effective radius as expressed on the coordinate system in which a vertex of said aspherical lens surface is set at the origin, an x axis is set as the optical axis and a y axis is set as a line which passes through the origin and orthogonally intersects said x axis, x(h): a value of x of a paraxial curvature of said aspherical lens surface at said maximum effective radius as expressed on said coordinate system; and wherein the following conditions are satisfied:

$0.6<F_T^{1/2}\cdot f_1/f_T<0.9$ $0.9<|\beta_{2W}\cdot V^{1/2}|<1.3$ where, $f_T$: a resultant focal length of the whole system at the telephoto-end;

$F_T$: an F number at the telephoto-end;

$f_1$: a focal length of said first lens group;

$\beta_{2W}$: a magnification at the wide-end of said second lens group;

V: a zooming ratio.

25. A zoom lens system comprising a plurality of lens groups as shown below in an order from an object side:

a first lens group with a positive refractive power;

a second lens group with a negative refractive power;

a third lens group with a negative refractive power; and a fourth lens group with a positive refractive power, wherein, for varying a focal length from a wide-end to a telephoto-end, said second lens group is moved from an object side to an image side along an optical axis and said third lens group is moved to reciprocate on said optical axis, said first lens group having an aspherical lens surface, said aspherical lens surface being formed in a shape where the negative refractive power gradually increases or in a shape where the positive refractive power gradually decreases from said optical axis toward a periphery, and satisfying the following condition:

$10^{-3}<|xa(h)-x(h)|/h<10^{-1}$ where, h: a maximum effective radius of said aspherical lens surface, xa(h): a value of x at said maximum effective radius as expressed on the coordinate system in which a vertex of said aspherical lens surface is set at the origin, an x axis is set as the optical axis and a y axis is set as a line which passes through the origin and orthogonally intersects said x axis, x(h): a value of x of a paraxial curvature of said aspherical lens surface at said maximum effective radius as expressed on said coordinate system; and wherein said third lens group has a cemented lens component which comprises a biconcave negative refractive lens component and a biconvex positive refractive lens component.

26. A zoom lens system comprising a plurality of lens groups as shown below in an order from an object side:

a first lens group with a positive refractive power;

a second lens group with a negative refractive power;

a third lens group with a negative refractive power; and a fourth lens group with a positive refractive power, wherein, for varying a focal length from a wide-end to a telephoto-end, said second lens group is moved from an object side to an image side along an optical axis and said third lens group is moved to reciprocate on said optical axis, said first lens group having an aspherical lens surface, said aspherical lens surface being formed in a shape where the negative refractive power gradually increases or in a shape where the positive refractive power gradually decreases from said optical axis toward a periphery, and satisfying the following condition:

$$10^{-3} < |xa(h) - x(h)|/h < 10^{-1}$$

where, h: a maximum effective radius of said aspherical lens surface, xa(h): a value of x at said maximum effective radius as expressed on the coordinate system in which a vertex of said aspherical lens surface is set at the origin, an x axis is set as the optical axis and a y axis is set as a line which passes through the origin and orthogonally intersects said x axis, x(h): a value of x of a paraxial curvature of said aspherical lens surface at said maximum effective radius as expressed on said coordinate system; and wherein said fourth lens group has the following lens groups in an order from the object side:

a front lens group which has a meniscus-shaped positive refractive lens component the convex surface of which is faced to the object side, a biconvex positive refractive lens component, and a negative lens component to be cemented with said positive refractive lens component in an arrangement where a lens surface with a more intense curvature of said negative lens component is faced to said biconvex positive refractive lens component and the object side in this order from the object side; and a rear lens group which has a biconvex positive refractive lens component, two cemented lens components, and a positive refractive lens component with a lens surface having a more intense curvature faced to the object side in this order from the object side.

27. A zoom lens system comprising a plurality of lens groups as shown below in an order from an object side:

a first lens group with a positive refractive power;

a second lens group with a negative refractive power;

a third lens group with a negative refractive power; and a fourth lens group with a positive refractive power, wherein, for varying a focal length from a wide-end to a telephoto-end, said second lens group is moved from an object side to an image side along an optical axis and said third lens group is moved to reciprocate on said optical axis, wherein an aspherical lens surface is provided only on said first lens group, and said aspherical lens surface provided on said first lens group is formed in a shape where the negative refractive power gradually increases or in a shape where the positive refractive power gradually decreases from said optical axis toward the periphery.

28. A zoom lens system comprising a plurality of lens groups as shown below in an order from an object side:

a first lens group with a positive refractive power;

a second lens group with a negative refractive power;

a third lens group with a negative refractive power; and a fourth lens group with a positive refractive power, wherein, for varying a focal length from a wide-end to a telephoto-end, said second lens group is moved from an object side to an image side along an optical axis and said third lens group is moved to reciprocate on said optical axis;

wherein an aspherical lens surface is provided only on said first lens group, and said aspherical lens surface provided on said first lens group is formed in a shape where the negative refractive power gradually increases or in a shape where the positive refractive power gradually decreases from said optical axis toward the periphery; and wherein said aspherical lens surface provided on said first lens group satisfies the following condition:

$$10^{-3} < |xa(h) - x(h)|/h < 10^{-1}$$

where, h: a maximum effective radius of said aspherical lens surface, xa(h): a value of x at said maximum effective radius h as expressed on the coordinate system in which a vertex of said aspherical lens surface is set at the origin, an x axis is set as the optical axis and a y axis is set as a line which passes through the origin and orthogonally intersects said x axis, x(h): a value of x of a paraxial curvature radius of said aspherical lens surface at said maximum effective radius h as expressed on said coordinate system.

29. A zoom lens system comprising a plurality of lens groups as shown below in an order from an object side:

a first lens group with a positive refractive power;

a second lens group with a negative refractive power;

a third lens group with a negative refractive power; and a fourth lens group with a positive refractive power, wherein, for varying a focal length from a wide-end to a telephoto-end, said second lens group is moved from an object side to an image side along an optical axis and said third lens group is moved to reciprocate on said optical axis, wherein an aspherical lens surface is provided only on said second lens group, and said aspherical lens surface provided on said second lens group is formed in a shape where the positive refractive power gradually increases or in a shape where the negative refractive power gradually decreases from said optical axis toward the periphery.

30. A zoom lens system comprising a plurality of lens groups as shown below in an order from an object side:

a first lens group with a positive refractive power;

a second lens group with a negative refractive power;

a third lens group with a negative refractive power; and a fourth lens group with a positive refractive power, wherein, for varying a focal length from a wide-end to a telephoto-end, said second lens group is moved from an object side to an image side along an optical axis and said third lens group is moved to reciprocate on said optical axis, wherein an aspherical lens surface is provided only on said second lens group, and said aspherical lens surface provided on said second lens group is formed in a shape where the positive refractive power gradually increases or in a shape where the negative refractive power gradually decreases from said optical axis toward the periphery; and wherein said aspherical lens surface provided on said second lens group satisfies the following condition:

$$10^{-3} < |xa(h) - x(h)|/h < 10^{-1}$$

where, h: a maximum effective radius of said aspherical lens surface, xa(h): a value of x at said maximum effective radius h as expressed on the coordinate system in which a vertex of said aspherical lens surface is set at the origin, an x axis is set as the optical axis and a y axis is set as a line which passes through the origin and orthogonally intersects said x axis, x(h): a value of x of a paraxial curvature radius of said aspherical lens surface at said maximum effective radius h as expressed on said coordinate system.

31. A zoom lens system comprising a plurality of lens groups as shown below in an order from an object side:

a first lens group with a positive refractive power;

a second lens group with a negative refractive power;

a third lens group with a negative refractive power; and a fourth lens group with a positive refractive power, wherein, for varying a focal length from a wide-end to a telephoto-end, said second lens group is moved from an object side to an image side along an optical axis and said third lens group is moved to reciprocate on said optical axis, wherein each of said first and second lens groups has an aspherical lens surface, said aspherical lens surface provided on said first lens group is formed in a shape where the negative refractive power gradually increases or in a shape where the positive refractive power gradually decreases from said optical axis toward the periphery, and said aspherical lens surface provided on said second lens group is formed in a shape where the positive refractive power gradually increases or in a shape where the negative refractive power gradually decreases from said optical axis toward the periphery.

32. A zoom lens system comprising a plurality of lens groups as shown below in an order from an object side:

a first lens group with a positive refractive power;

a second lens group with a negative refractive power;

a third lens group with a negative refractive power; and a fourth lens group with a positive refractive power, wherein, for varying a focal length from a wide-end to a telephoto-end, said second lens group is moved from an object side to an image side along an optical axis and said third lens group is moved to reciprocate on said optical axis, wherein each of said first and second lens groups has an aspherical lens surface, said aspherical lens surface provided on said first lens group is formed in a shape where the negative refractive power gradually increases or in a shape where the positive refractive power gradually decreases from said optical axis toward the periphery, and said aspherical lens surface provided on said second lens group is formed in a shape where the positive refractive power gradually increases or in a shape where the negative refractive power gradually decreases from said optical axis toward the periphery; and wherein said aspherical lens surface provided on said first lens group and said second lens group satisfies the following conditions:

$$10^{-3} < |xa_1(h_1) - x_1(h_1)|/h_1 < 10^{-1}$$

$$10^{-3} < |xa_2(h_2) - x_2(h_2)|/h_2 < 10^{-1}$$

where, $h_1$: a maximum effective radius of said aspherical lens surface of said first lens group, $h_2$: a maximum effective radius of said aspherical lens surface of said second lens group, $xa_1(h_1)$: a value of x at said maximum effective radius $h_1$ as expressed on the coordinate system in which a vertex of said aspherical lens surface of said first lens group is set at the origin, an x axis is set as the optical axis and a y axis is set as a line which passes through the origin and orthogonally intersects said x axis, $xa_2(h_2)$: a value of x at said maximum effective radius $h_2$ as expressed on the coordinate system in which a vertex of said aspherical lens surface of said second lens group is set at the origin, an x axis is set as the optical axis and a y axis is set as a line which passes through the origin and orthogonally intersects said x axis, $x_1(h_1)$: a value of x of a paraxial curvature radius of said aspherical lens surface at said maximum effective radius $h_1$ as expressed on the coordinate system in which a vertex of said aspherical lens surface of said first lens group is set at the origin, an x axis is set as the optical axis and a y axis is set as a line which passes through the origin and orthogonally intersects said x axis, $x_2(h_2)$: a value of x of a paraxial curvature radius of said aspherical lens surface at said maximum effective radius $h_2$ as expressed on the coordinate system in which a vertex of said aspherical lens surface of said second lens group is set at the origin, an x axis is set as the optical axis and a y axis is set as a line which passes through the origin and orthogonally intersects said x axis.

33. A zoom lens system comprising a plurality of lens groups as shown below in an order from an object side:

a first lens group with a positive refractive power;

a second lens group with a negative refractive power;

a third lens group with a negative refractive power;

and a fourth lens group with a positive refractive power, wherein, for varying a focal length from a wide-end to a telephoto-end, said second lens group is moved from an object side to an image side along an optical axis and said third lens group is moved to reciprocate on said optical axis, wherein said second lens group has an aspherical lens surface, and said aspherical lens surface is formed in a shape where the positive refractive power gradually increases or in a shape where the negative refractive power gradually decreases from said optical axis toward a periphery, and satisfies the following condition:

$$10^{-3} < |xa(h) - x(h)|/h < 10^{-1}$$

where,
- h: a maximum effective radius of said aspherical lens surface,
- xa(h): a value of x at said maximum effective radius h as expressed on the coordinate system in which a vertex of said aspherical lens surface is set at the origin, an x axis is set as the optical axis and a y axis is set as a line which passes through the origin and orthogonally intersects said x axis,
- x(h): a value of x of a paraxial curvature radius of said aspherical lens surface at said maximum effective radius h as expressed on said coordinate system; and wherein said first lens group has a negative refractive lens group and at least three positive refractive lens groups, and said second lens group has at least three lens groups.

34. A zoom lens system according to claim 33, wherein said negative refractive lens group of said first lens group satisfies the following condition:

$$-2.0 < (R_2 + R_1)/(R_2 - R_1) < -1.5$$

where,
- $R_1$: a radius of paraxial curvature of the lens surface of a lens nearest to the object side of said negative refractive lens group;
- $R_2$: a radius of paraxial curvature of the lens surface of a lens nearest to an image side of said negative refractive lens group.

35. A zoom lens system according to claim 33, wherein the following condition is satisfied:

$$0.6 < F_T^{1/2} \cdot f_1/f_T < 0.9$$

where,
- $f_T$: a resultant focal length of the whole system at the telephoto-end;
- $F_T$: an F number at the telephoto-end;
- $f_1$: a focal length of said first lens group.

36. A zoom lens system according to claim 33, wherein the following condition is satisfied:

$$0.9 < |\beta_{2W} \cdot V^{1/2}| < 1.3$$

where,
- $\beta_{2W}$: a magnification at the wide-end of said second lens group;
- V: a zooming ratio.

37. A zoom lens system according to claim 33, wherein said third lens group has a cemented lens component which comprises a biconcave negative refractive lens component and a biconvex positive refractive lens component.

38. A zoom lens system according to claim 33, wherein said fourth lens group has the following lens groups in an order from the object side:

a front lens group which has a meniscus-shaped positive refractive lens component the convex surface of which is faced to the object side, a biconvex positive refractive lens component, and a negative lens component to be cemented with said positive refractive lens component in an arrangement where a lens surface with a more intense curvature of said negative lens component is faced to said biconvex positive refractive lens component and the object side in this order from the object side; and a rear lens group which has a biconvex positive refractive lens component, two cemented lens components, and a positive refractive lens component with a lens surface having a more intense curvature faced to the object side in this order from the object side.

39. A zoom lens system comprising a plurality of lens groups as shown below in an order from an object side:

a first lens group with a positive refractive power;

a second lens group with a negative refractive power;

a third lens group with a negative refractive power; and a fourth lens group with a positive refractive power, wherein, for varying a focal length from a wide-end to a telephoto-end, said second lens group is moved from an object side to an image side along an optical axis and said third lens group is moved to reciprocate on said optical axis, and said first lens group has at least one aspherical lens surface which is formed in a shape where the negative refractive power gradually increases or in a shape where the positive refractive power gradually decreases from said optical axis toward a periphery, said second lens group has at least one aspherical lens surface which is formed in a shape where the positive refractive power gradually increases or in a shape where the negative refractive power gradually decreases from said optical axis toward a periphery, and satisfies the following conditions:

$$10^{-3} < |xa_1(h_1) - x_1(h_1)|/h_1 < 10^{-1}$$

$$10^{-3} < |xa_2(h_2) - x_2(h_2)|/h_2 < 10^{-1}$$

where,
- $h_1$: a maximum effective radius of said aspherical lens surface of said first lens group,
- $h_2$: a maximum effective radius of said aspherical lens surface of said second lens group,
- $xa_1(h_1)$: a value of x at said maximum effective radius $h_1$ as expressed on the coordinate system in which a vertex of said aspherical lens surface of said first lens group is set at the origin, an x axis is set as the optical axis and a y axis is set as a line which passes through the origin and orthogonally intersects said x axis,
- $xa_2(h_2)$: a value of x at said maximum effective radius $h_2$ as expressed on the coordinate system in which a vertex of said aspherical lens surface of said second lens group is set at the origin, an x axis is set as the optical axis and a y axis is set as a line which passes through the origin and orthogonally intersects said x axis,
- $x_1(h_1)$: a value of x of a paraxial curvature radius of said aspherical lens surface at said maximum effective radius $h_1$ as expressed on the coordinate system in which a vertex of said aspherical lens surface of said first lens group is set at the origin, an x axis is set as the optical axis and a y axis is set as a line which passes through the origin and orthogonally intersects said x axis, $x_2(h_2)$: a value of x of a paraxial curvature radius of said aspherical lens surface at said maximum effective radius $h_2$ as expressed on the coordinate system in which a vertex of said aspherical lens surface of said second lens group is set at the origin, an x axis is set as the optical axis and a y axis is set as a line which passes through the origin and orthogonally intersects said x axis; and wherein said first lens group has a negative refractive lens group and at least three positive refractive lens groups, and said second lens group has at least three lens groups.

40. A zoom lens system according to claim 39, wherein, of said first lens group, at least one of said negative refractive lens group and said positive refractive lens groups, which is located nearest to the object side, has at least one aspherical lens surface.

41. A zoom lens system according to claim 39, wherein said negative refractive lens group of said first lens group satisfies the following condition:

$$-1.0<(R_2+R_1)/(R_2-R_1)<-0.1$$

where, $R_1$: a radius of paraxial curvature of the lens surface of a lens nearest to the object side of said negative refractive lens group;

$R_2$: a radius of paraxial curvature of the lens surface of a lens nearest to an image side of said negative refractive lens group.

42. A zoom lens system according to claim 39, wherein the following condition is satisfied:

$$0.6<F_T^{1/2}\cdot f_1/f_T<0.9$$

where, $f_T$: a resultant focal length of the whole system at the telephoto-end;

$F_T$: an F number at the telephoto-end;

$f_1$: a focal length of said first lens group.

43. A zoom lens system according to claim 39, wherein the following condition is satisfied:

$$0.9<|\beta_{2W}\cdot V^{1/2}|<1.3$$

where, $\beta_{2W}$: a magnification at the wide-end of said second lens group;

V: a zooming ratio.

44. A zoom lens system according to claim 39, wherein said third lens group has a cemented lens component which comprises a biconcave negative refractive lens component and a biconvex positive refractive lens component.

45. A zoom lens system according to claim 39, wherein said fourth lens group has the following lens groups in an order from the object side:

a front lens group which has a meniscus-shaped positive refractive lens component the convex surface of which is faced to the object side, a biconvex positive refractive lens component, and a negative lens component to be cemented with said positive refractive lens component in an arrangement where a lens surface with a more intense curvature of said negative lens component is faced to said biconvex positive refractive lens component and the object side in this order from the object side; and a rear lens group which has a biconvex positive refractive lens component, two cemented lens components, and a positive refractive lens component with a lens surface having a more intense curvature faced to the object side in this order from the object side.

\* \* \* \* \*